(12) United States Patent
Hirano et al.

(10) Patent No.: US 12,242,266 B2
(45) Date of Patent: Mar. 4, 2025

(54) REMOTE ASSISTANCE METHOD, REMOTE ASSISTANCE SYSTEM, AND NON-TRANSITORY COMPUTER-READABLE STORAGE MEDIUM

(71) Applicant: TOYOTA JIDOSHA KABUSHIKI KAISHA, Toyota (JP)

(72) Inventors: Maiko Hirano, Nagoya (JP); Yoshitaka Adachi, Tokyo-to (JP); Kentaro Ichikawa, Sunto-gun (JP); Koji Taguchi, Sagamihara (JP); Narihito Yamazato, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 182 days.

(21) Appl. No.: 18/160,411

(22) Filed: Jan. 27, 2023

(65) Prior Publication Data

US 2023/0259127 A1    Aug. 17, 2023

(30) Foreign Application Priority Data

Feb. 15, 2022    (JP) ................................ 2022-021586

(51) Int. Cl.
G05D 1/00    (2024.01)

(52) U.S. Cl.
CPC ......... *G05D 1/0038* (2013.01); *G05D 1/0214* (2013.01); *G05D 1/0246* (2013.01)

(58) Field of Classification Search
CPC ............... G05D 1/0038; G05D 1/0214; G05D 1/0246; G05D 1/0022; G05B 19/0423; G05B 2219/23051
See application file for complete search history.

(56) References Cited

U.S. PATENT DOCUMENTS

| | | | | |
|---|---|---|---|---|
| 2018/0181118 A1* | 6/2018 | Yoneda | ................. | B60W 30/00 |
| 2019/0146485 A1* | 5/2019 | Yoneda | ................... | G05D 1/00 |
| | | | | 701/2 |
| 2019/0302760 A1* | 10/2019 | Katou | ................. | G05D 1/0061 |
| 2019/0361436 A1* | 11/2019 | Ueda | ....................... | G08G 1/09 |
| 2020/0282980 A1* | 9/2020 | Kinoshita | ............ | G05D 1/0027 |

(Continued)

FOREIGN PATENT DOCUMENTS

| | | |
|---|---|---|
| JP | 2020-003890 A | 1/2020 |
| JP | 2020-167551 A | 10/2020 |

(Continued)

*Primary Examiner* — Abdalla A Khaled
(74) *Attorney, Agent, or Firm* — Oliff PLC

(57) ABSTRACT

According to the remote assistance method of the present disclosure, first, a positional relationship between the vehicle having an autonomous traveling function and an object present around the vehicle at a future time beyond a current time is displayed spatially on a display device, the positional relationship being predicted based on a path plan for autonomous traveling created by the vehicle and information on the object. Next, assistance content input from a remote operator is transmitted to the vehicle. Then, remote assistance corresponding to the assistance content is executed in the vehicle in response to confirmation that the positional relationship between the vehicle and the object displayed on the display device when the assistance content is input is realized after the vehicle receives the assistance content.

9 Claims, 15 Drawing Sheets

(56) References Cited

U.S. PATENT DOCUMENTS

| | | | |
|---|---|---|---|
| 2020/0310416 A1* | 10/2020 | Matsunaga | G06F 3/147 |
| 2020/0409368 A1* | 12/2020 | Caldwell | G05D 1/0088 |
| 2021/0027625 A1* | 1/2021 | Jung | G08G 1/09626 |
| 2021/0058173 A1 | 2/2021 | Otaki et al. | |
| 2021/0086792 A1* | 3/2021 | Nordbruch | B60W 50/029 |
| 2021/0149389 A1* | 5/2021 | Weslosky | G05D 1/0038 |
| 2022/0135067 A1* | 5/2022 | Pfadler | G07C 5/008 |
| | | | 701/23 |
| 2022/0371589 A1* | 11/2022 | Kono | G05D 1/0027 |
| 2022/0413484 A1* | 12/2022 | Choi | G08G 1/167 |
| 2022/0413489 A1* | 12/2022 | Nakano | H04W 4/44 |
| 2023/0249701 A1* | 8/2023 | Valtersson | B60W 50/035 |
| | | | 701/2 |
| 2023/0259124 A1* | 8/2023 | Suehiro | G05D 1/0061 |
| | | | 701/2 |
| 2023/0259125 A1* | 8/2023 | Suehiro | H04W 24/08 |
| | | | 701/2 |
| 2023/0418284 A1* | 12/2023 | Ishikawa | G05D 1/2247 |

FOREIGN PATENT DOCUMENTS

| JP | 2021-018744 A | 2/2021 |
|---|---|---|
| JP | 2021-033612 A | 3/2021 |

* cited by examiner

REMOTE ASSISTANCE METHOD, REMOTE ASSISTANCE SYSTEM, AND NON-TRANSITORY COMPUTER-READABLE STORAGE MEDIUM

CROSS-REFERENCE TO RELATED APPLICATION

The present application claims priority under 35 U.S.C. § 119 to Japanese Patent Application No. 2022-021586, filed Feb. 15, 2022, the contents of which application are incorporated herein by reference in their entirety.

BACKGROUND

Field

The present disclosure relates to a remote assistance technique for providing remote assistance to a vehicle having an autonomous traveling function.

Background Art

There is known a remote assistance technique in which an autonomous driving vehicle is monitored remotely and a remote operator gives a determination or an instruction to the autonomous driving vehicle as necessary to assist autonomous driving of the autonomous driving vehicle. JP2020-167551A discloses an example of such a remote assistance technique.

According to the prior art disclosed in JP2020-167551A, information on a vehicle and information on an object around the vehicle are acquired from the vehicle to a remote driving device. The information on the vehicle includes a current geographic location of the vehicle, a current velocity and acceleration of the vehicle, an identity of the vehicle in the remote driving service, a future trajectory recommended by the autonomous driving function, and the like. The information on the object includes a type of the object, a current geographic location of the object, a velocity and acceleration of the object, a future predicted trajectory of the object, etc. The future predicted trajectory of the object may be generated based on, for example, the geographic location, velocity, and acceleration of the object.

According to the prior art, the remote driving device displays a virtual object for representing an object on a display device. When determining the display position of the virtual object, the remote driving device takes into account a delay occurring when acquiring information from the vehicle and a delay occurring when providing an operation instruction from the remote driving device to the vehicle. That is, according to the prior art, not the current state around the vehicle but the future state in consideration of the delay time is displayed on the display device.

However, although the prior art displays the future state in consideration of the delay time, there is a possibility that an error occurs between the assumed delay time and the actual delay time. In this case, the vehicle cannot be operated at the timing intended by the remote operator.

In addition to JP2020-167551A, JP2021-018744A, JP2021-033612A, and JP2020-003890A can be exemplified as documents showing the technical level of the technical field related to the present disclosure.

SUMMARY

The present disclosure has been made in view of the above-described problems, and an object of the present disclosure is to provide a remote assistance technique capable of eliminating an influence of a shift in assistance timing caused by a delay occurring between a vehicle and a remote assistance terminal and causing the vehicle to operate at a timing intended by a remote operator.

The present disclosure provides a remote assistance method and a remote assistance system as a remote assistance technology for achieving the above object.

A remote assistance method according to the present disclosure is a method for remotely assisting a vehicle having an autonomous traveling function. The remote assistance method according to an embodiment of the present disclosure includes spatially displaying, on a display device, a positional relationship between the vehicle and an object present around the vehicle at a future time beyond a current time, the positional relationship being predicted based on a path plan for autonomous traveling created by the vehicle and information on the object, and transmitting assistance content input from a remote operator to the vehicle. Further, the remote assistance method according to the present disclosure includes executing, in the vehicle, remote assistance corresponding to the assistance content in response to confirmation that the positional relationship between the vehicle and the object displayed on the display device when the assistance content is input is realized after the vehicle receives the assistance content.

A remote assistance system according to the present disclosure is a system for remotely assisting a vehicle having an autonomous traveling function. The remote assistance system according to the present disclosure includes at least one memory including at least one program and at least one processor coupled to the at least one memory. The at least one program is configured to cause the at least one processor to execute the following processing. The processing executed by the at least one processor includes spatially displaying, on a display device, a positional relationship between the vehicle and an object present around the vehicle at a future time beyond a current time, the positional relationship being predicted based on a path plan for autonomous traveling created by the vehicle and information on the object, and transmitting assistance content input from a remote operator to the vehicle. Further, the processing executed by the at least one processor includes executing, in the vehicle, remote assistance corresponding to the assistance content in response to confirmation that the positional relationship between the vehicle and the object displayed on the display device when the assistance content is input is realized after the vehicle receives the assistance content.

According to the remote assistance technique of the present disclosure, the remote assistance corresponding to the assistance content input by the remote operator is executed in the vehicle on condition that it is confirmed that the positional relationship between the vehicle and the object displayed on the display device when the assistance content is input by the remote operator is realized. That is, even if the vehicle receives the assistance content, the remote assistance corresponding to the assistance content is not executed in the vehicle until the above-described confirmation is obtained. According to this, it is possible to eliminate the influence of the shift in the assistance timing caused by the delay occurring between the vehicle and the remote assistance terminal, and to operate the vehicle at the timing intended by the remote operator. Therefore, it is possible to increase the reliability of the determination of the remote operator.

In the remote assistance technique of the present disclosure, the confirmation may include confirming that a degree of coincidence between the positional relationship between the vehicle and the object displayed on the display device when the assistance content is input and an actual positional relationship between the vehicle and the object acquired by a sensor of the vehicle is within an allowable range. When an error is included in the prediction based on the path plan and the information on the object, a deviation may occur between the predicted positional relationship between the vehicle and the object and the actual positional relationship between the vehicle and the object. By using the degree of coincidence between the predicted positional relationship between the vehicle and the object and the actual positional relationship between the vehicle and the object as a determination material, it is possible to accurately determine whether or not the positional relationship between the vehicle and the object displayed on the display device when the assistance content is input by the remote operator is realized.

In the remote assistance technique according to the present disclosure, the information on the object may be information acquired by the sensor, and at least a part of the information on the object acquired by the sensor may be used to create the path plan. According to this, since the positional relationship between the vehicle and the object predicted based on the information acquired by the sensor of the vehicle is compared with the actual positional relationship between the vehicle and the object acquired by the same sensor, it is possible to improve the accuracy of the determination based on the degree of coincidence.

Further, in the remote assistance technique of the present disclosure, the confirmation may include confirming that a time at which the remote assistance corresponding to the assistance content becomes executable in the vehicle is not past the future time of the positional relationship between the vehicle and the object displayed on the display device when the assistance content is input. If the time at which the remote assistance becomes executable in the vehicle does not pass the future time of the display device when the assistance content is input, it can be determined that the positional relationship between the vehicle and the object displayed on the display device is realized or will be realized in the future. However, when the time at which the remote assistance can be executed in the vehicle has passed the future time, it can be determined that the positional relationship between the vehicle and the object displayed on the display device is no longer realized.

The present disclosure provides at least one program for achieving the above object. The at least one program according to an embodiment of the present disclosure is configured to cause a computer to execute the following processing. The processing executed by the computer includes spatially displaying, on a display device, a positional relationship between a vehicle having an autonomous traveling function and an object present around the vehicle at a future time beyond a current time, the positional relationship being predicted based on a path plan for autonomous traveling created by the vehicle and information on the object, and transmitting assistance content input from a remote operator to the vehicle. Further, the processing executed by the computer includes executing, in the vehicle, remote assistance corresponding to the assistance content in response to confirmation that the positional relationship between the vehicle and the object displayed on the display device when the assistance content is input is realized after the vehicle receives the assistance content. The at least one program of the present disclosure may be stored in a non-transitory computer-readable storage medium or may be provided via a network.

As described above, according to the remote assistance technique of the present disclosure, it is possible to eliminate the influence of the shift in the assistance timing caused by the delay occurring between the vehicle and the remote assistance terminal and to operate the vehicle at the timing intended by the remote operator.

DETAILED DESCRIPTION

Hereinafter, an embodiment of the present disclosure will be described with reference to the drawings. However, in the embodiments described below, when a numerical value such as the number, quantity, amount, range, or the like of each element is mentioned, the idea according to the present disclosure is not limited to the mentioned numerical value except for a case where the numerical value is clearly specified in particular or a case where the numerical value is obviously specified to the numerical value in principle. In addition, a structure or the like described in the following embodiment is not always necessary to the idea according to the present disclosure except for a case where the structure or the like is clearly specified in particular or a case where the structure or the like is obviously specified in principle.

1. Configuration of Remote Assistance System

Figure 1:
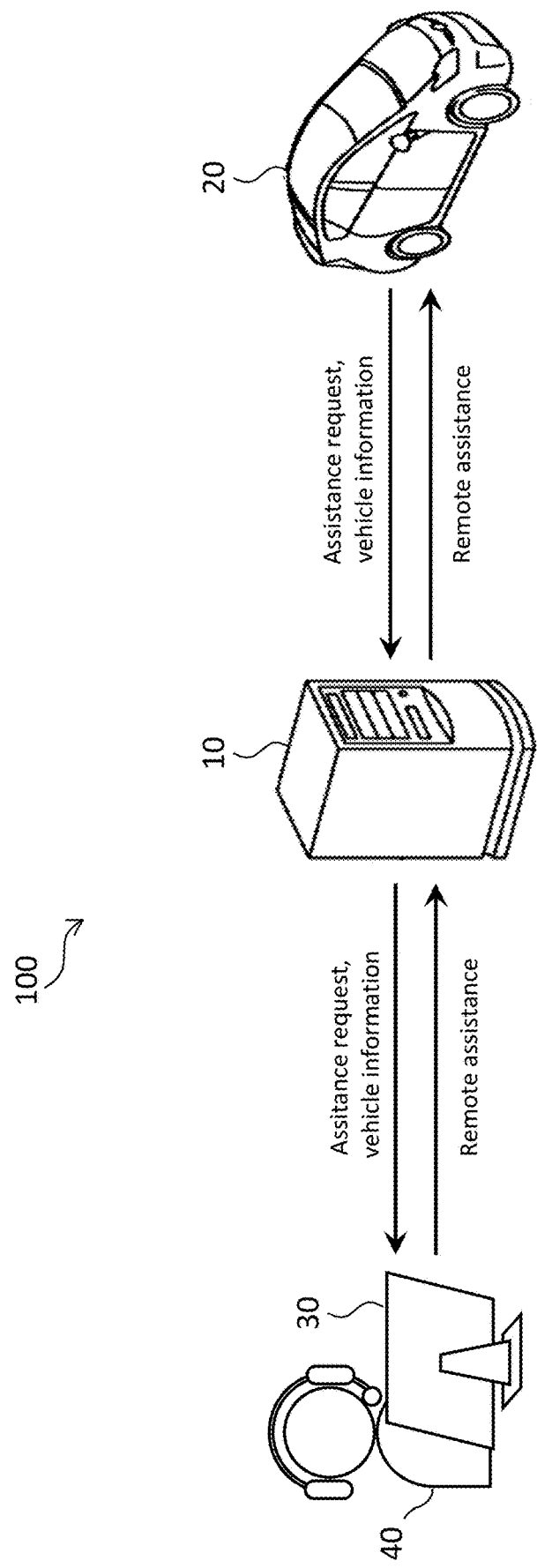
FIG. 1 is a configuration diagram of a remote assistance system for an autonomous driving vehicle to which a remote assistance method of the present disclosure is applied.

FIG. 1 is a configuration diagram of a remote assistance system for an autonomous driving vehicle. The remote assistance system 100 is a system that assists autonomous driving of the autonomous driving vehicle 20 having an autonomous traveling function by remote operation of an operator 40. The operator 40 who remotely assists the autonomous driving vehicle 20 is referred to as a remote operator. The autonomous driving level of the autonomous driving vehicle 20 targeted for remote assistance is assumed to be level 4 or level 5, for example. Hereinafter, the autonomous driving vehicle 20 is simply referred to as the vehicle 20.

A remote assistance terminal 30 is used for remote assistance of the vehicle 20 by the operator 40. The remote assistance terminal 30 is connected to a server 10 of the management center via a communication network including the Internet. The vehicle 20 is also connected to the server 10 of the management center via a communication network including 4G and 5G. A plurality of remote assistance terminals 30 and a plurality of vehicles 20 are connected to the server 10. The server 10 receiving the assistance request from the vehicle 20 selects a person in charge from among the available operators 40, and connects the remote assistance terminal 30 of the operator 40 in charge with the vehicle 20 requesting assistance.

The situation in which the vehicle 20 requests assistance includes, for example, a case of passing a preceding vehicle, a case of passing through a crosswalk, a case of turning right at an intersection, a case of deviating from a lane to avoid an obstacle, and the like. In the remote assistance, at least a part of judgement for autonomous driving by the vehicle 20 is performed by the operator 40. Basic calculations related to recognition, judgement, and operation required for driving are performed in the vehicle 20. The operator 40 judges an action to be taken by the vehicle 20 based on various kinds of vehicle information transmitted from the vehicle 20, and transmits a command to the vehicle 20 based on the judgement result. The remote assistance command sent from the operator 40 to the vehicle 20 includes a command to advance the vehicle 20 and a command to stop the vehicle 20. The remote assistance command includes a command for avoiding an offset with respect to a forward obstacle, a command for passing a preceding vehicle, a command for emergency evacuation, and the like.

Figure 2:
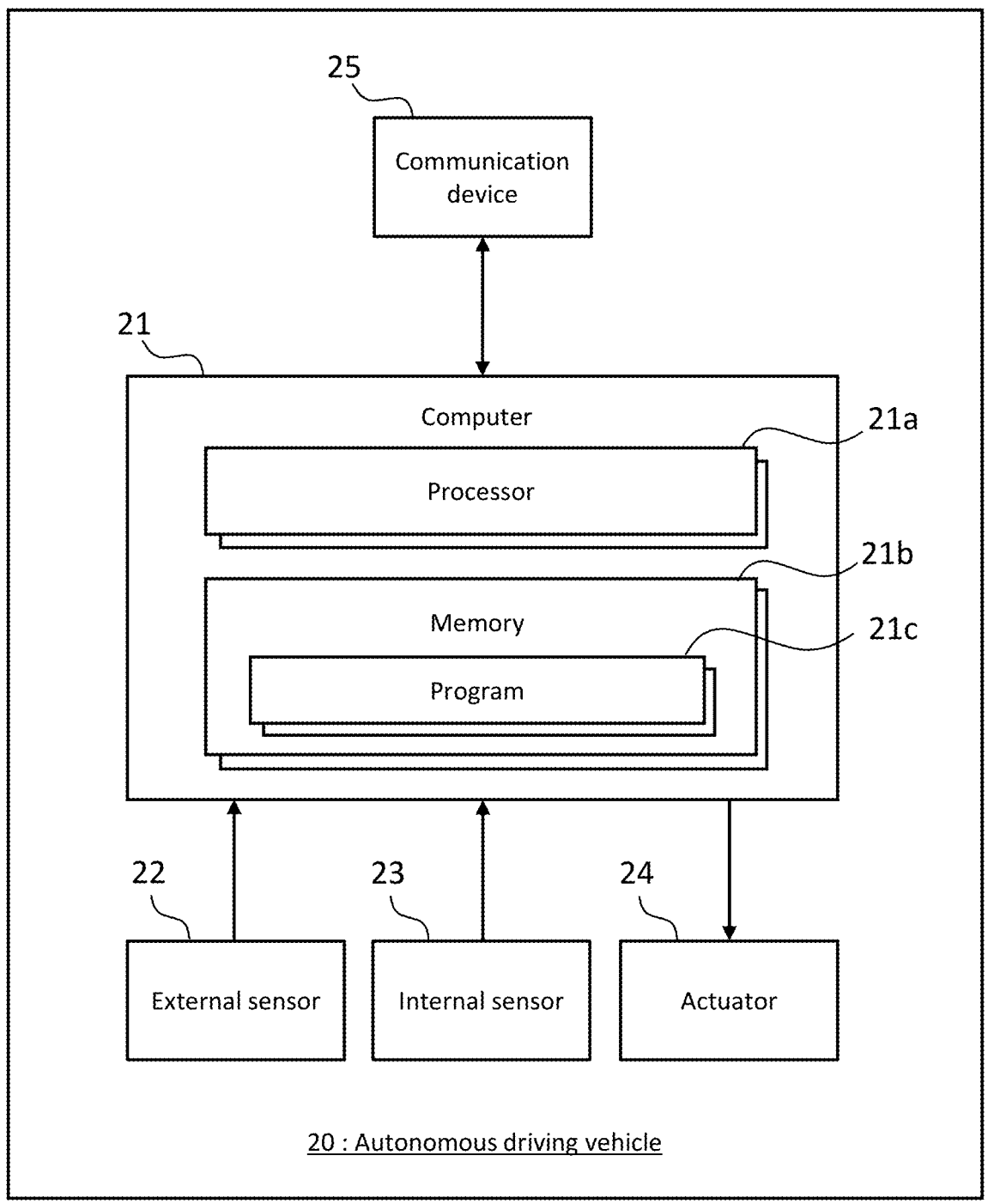
FIG. 2 is a block diagram illustrating an example of a configuration of the autonomous driving vehicle.

FIG. 2 is a block diagram illustrating an example of a configuration of the vehicle 20. The vehicle 20 includes a computer 21. The computer 21 is an aggregate of a plurality of electronic control units (ECUs) mounted on the vehicle 20. The vehicle 20 includes at least one external sensor 22, at least one internal sensor 23, at least one actuator 24, and a communication device 25. These components are connected to the computer 21 using an in-vehicle network such as a controller area network (CAN).

The computer 21 comprises at least one processor 21a (hereinafter referred to simply as processor 21a) and at least one memory 21b (hereinafter referred to simply as memory 21b) coupled to the processor 21a. The memory 21b stores at least one program 21c executable by the processor 21a (hereinafter, simply referred to as a program 21c) and various pieces of information related thereto. The program 21c includes a plurality of executable instructions. The memory 21b stores high-precision three-dimensional map information for autonomous driving.

When the processor 21a executes the program 21c, various processes are executed by the processor 21a. The program 21c includes an autonomous driving program for achieving autonomous driving. When the autonomous driving program is executed by the processor 21a, the computer 21 functions as an autonomous driving system that autonomously drives the vehicle 20. Hereinafter, the computer 21 as the autonomous driving system is simply referred to as an autonomous driving system. Further, the program 21c includes a remote assistance program for receiving remote assistance. When the remote assistance program is executed by the processor 21a, processing for requesting assistance from the server 10 and executing the assistance content acquired from the server 10 in the vehicle 20 is executed.

The external sensor 22 includes a camera that images the surroundings of the vehicle 20, in particular, the front of the vehicle 20. A plurality of cameras may be provided, and may capture images of the side and the rear of the vehicle 20 in addition to the front. The camera may be shared for autonomous driving and remote assistance by the operator 40, or a camera for autonomous driving and a camera for remote assistance may be separately provided. The external sensor 22 includes a recognition sensor other than the camera. The recognition sensor is a sensor that acquires information for recognizing a situation around the vehicle 20. Examples of the recognition sensor other than the camera include a LiDAR and a millimeter wave radar. The external sensor 22 includes a position sensor that detects a position and a direction of the vehicle 20. As the position sensor, a GPS sensor is exemplified. Information obtained by the external sensor 22 is transmitted to the computer 21.

The internal sensor 23 includes a state sensor that acquires information about the motion of the vehicle 20. Examples of the state sensor include a wheel speed sensor, an acceleration sensor, an angular velocity sensor, and a steering angle sensor. As the acceleration sensor and the angular velocity sensor, an IMU may be used. Information obtained by the internal sensor 23 is transmitted to the computer 21.

Hereinafter, the information obtained by the internal sensor 23 and the information obtained by the external sensor 22 are collectively referred to as vehicle information. However, in addition to the information acquired by the sensor of the vehicle 20, the vehicle information includes a path plan of the vehicle 20 created by the autonomous driving system and prediction information of an environment surrounding the vehicle 20. The autonomous driving system predicts a change in the environment surrounding the vehicle 20 in a short period of time in the future using information on the situation around the vehicle 20 obtained by the external sensor 22, and creates the path plan based on the prediction information and a target route determined by, for example, a navigation system.

Examples of the actuator 24 include a steering device that steers the vehicle 20, a driving device that drives the vehicle 20, and a braking device that brakes the vehicle 20. The steering device includes, for example, a power steering system, a steer-by-wire steering system, and a rear wheel steering system. The drive device includes, for example, an engine, an EV system, and a hybrid system. The braking device includes, for example, a hydraulic brake and an electric regenerative brake. The actuator 24 is operated by a control signal transmitted from the computer 21.

The communication device 25 is a device that controls wireless communication between the vehicle 20 and the outside. The communication device 25 communicates with the server 10 via a communication network. The information processed by the computer 21 is transmitted to the server 10 using the communication device 25. The information processed by the server 10 is taken into the computer 21 using the communication device 25. In addition, when vehicle-to-vehicle communication with another vehicle or road-to-vehicle communication with an infrastructure is required for autonomous driving, communication with these external devices is also performed by the communication device 25.

Figure 3:
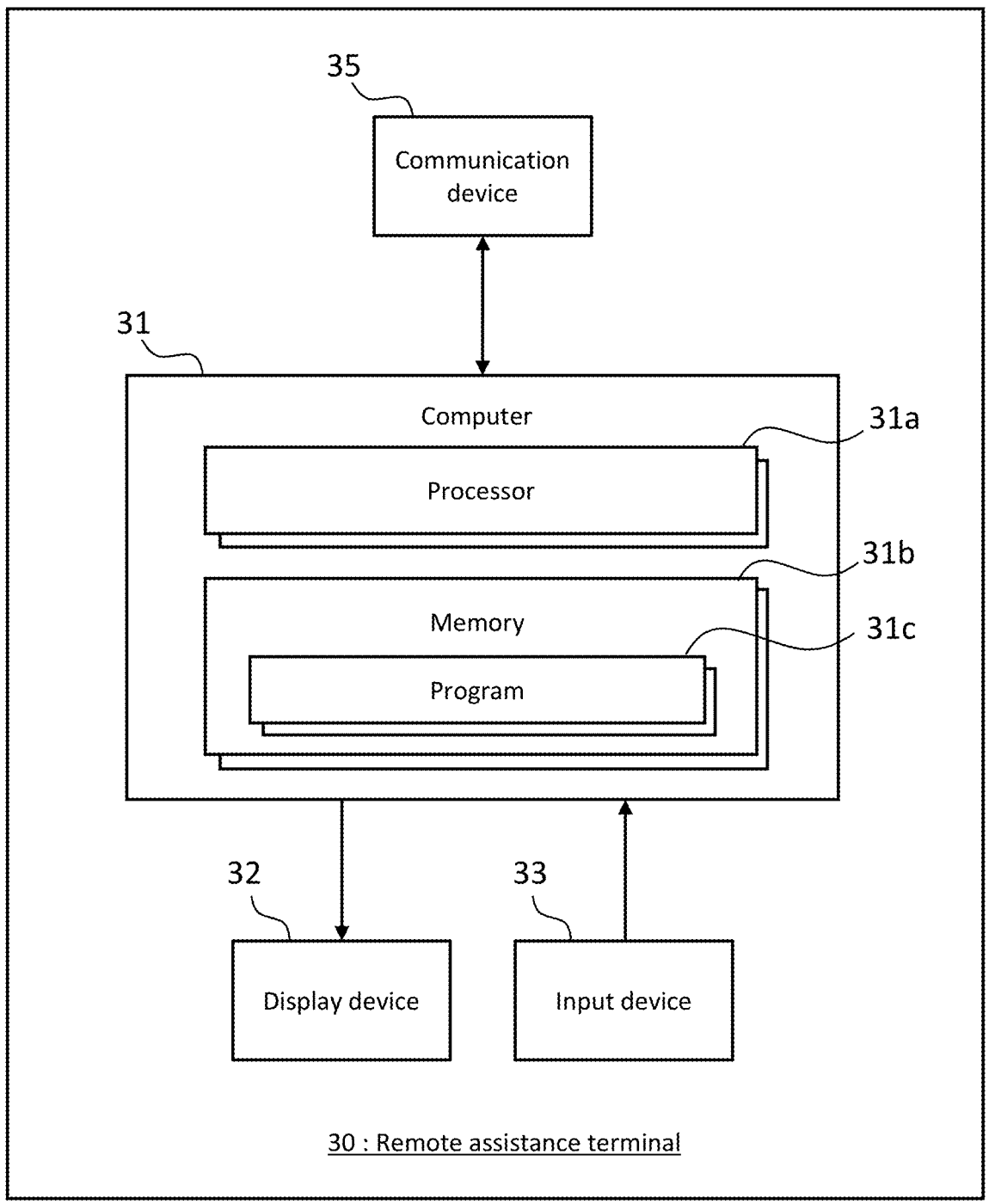
FIG. 3 is a block diagram illustrating an example of a configuration of a remote assistance terminal.

FIG. 3 is a block diagram illustrating an example of a configuration of the remote assistance terminal 30. The remote assistance terminal 30 includes a computer 31, a display device 32, an input device 33, and a communication device 35. The display device 32, the input device 33, and the communication device 35 are connected to the computer 31. The remote assistance terminal 30 may be installed in the management center or may be installed outside the management center, for example, in the home of the operator 40.

The computer 31 comprises at least one processor 31*a* (hereinafter referred to simply as processor 31*a*) and at least one memory 31*b* (hereinafter referred to simply as memory 31*b*) coupled to the processor 31*a*. The memory 31*b* stores at least one program 31*c* executable by the processor 31*a* (hereinafter, simply referred to as a program 31*c*) and various pieces of information related thereto. The program 31*c* includes a plurality of executable instructions. The memory 31*b* stores high-precision three-dimensional map information for autonomous driving.

When the processor 31*a* executes the program 31*c*, various processes are executed by the processor 31*a*. The program 31*c* includes an operator UI management program that manages a user interface for providing remote assistance to the vehicle 20. When the operator UI management program is executed by the processor 31*a*, the computer 31 functions as an operator UI management system, and executes processing for displaying information necessary for remote assistance on the display apparatus 32 described later.

Figure 4B:
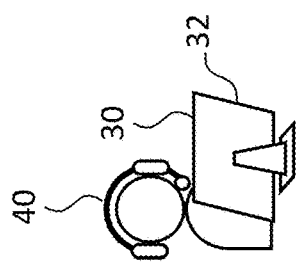
FIG. 4B is a diagram illustrating an example of a display screen of the remote assistance terminal.
Figure 4B:
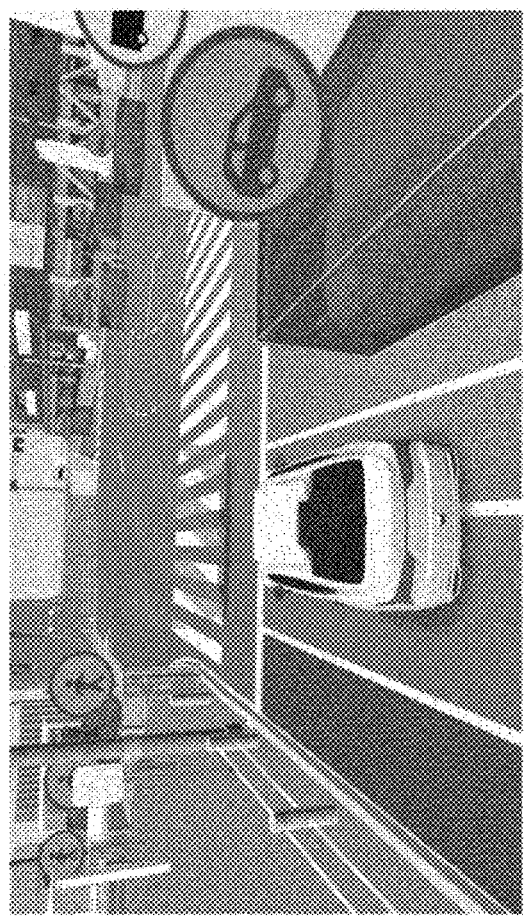
Figure 4A:
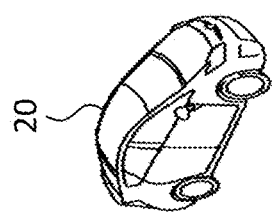
FIG. 4A is a diagram illustrating an example of an image acquired by a camera of the autonomous driving vehicle.
Figure 4A:
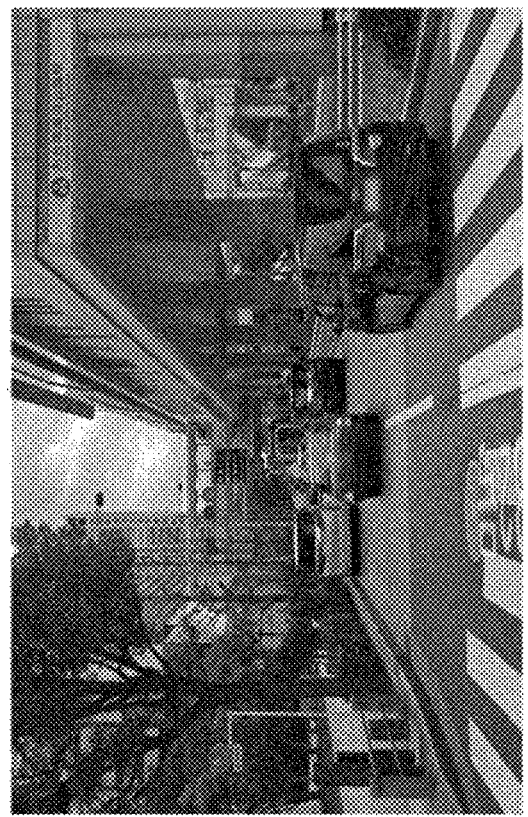

The display device 32 is a device that displays information necessary for the operator 40 to perform remote assistance. Specifically, the information displayed by the display device 32 is information corresponding to an image in front of the vehicle 20. However, the information displayed on the display device 32 is not an image acquired by the camera of the vehicle 20, that is, information used by the autonomous driving system of the vehicle 20. FIG. 4A is a diagram illustrating an example of the image acquired by the camera of the vehicle 20. FIG. 4B is an example of a display screen of the display device 32. The information displayed on the display device 32 is a 3D model-based image created by the computer 31. In this image, the surrounding environment of the vehicle 20 is reproduced on a three-dimensional space. A stationary object in the surrounding environment can be spatially reproduced using the high-precision three-dimensional map information and the position information of the vehicle 20. The contents of information displayed on the display device 32 and a method of generating the information will be described in detail later.

The input device 33 is a device for inputting an operation for remote assistance of the operator 40. The information input by the input device 33 is processed by the computer 31 and transmitted to the vehicle 20. Specific examples of the input device 33 include a button, a lever, and a touch panel. For example, the vehicle 20 may be instructed to proceed/stop or to move in the lateral direction by the direction in which the lever is tilted. The movement in the lateral direction includes, for example, offset avoidance with respect to a forward obstacle, lane change, and passing of a preceding vehicle.

The communication device 35 is a device that controls communication between the remote assistance terminal 30 and the outside. The communication device 35 communicates with the server 10 via a communication network. The information processed by the computer 31 is transmitted to the server 10 using the communication device 35. The information processed by the server 10 is taken into the computer 31 using the communication device 35.

2. Overview of Remote Assistance Method

An object of the remote assistance method of the present disclosure is to eliminate the influence of the slip in the assistance timing caused by the delay occurring between the vehicle 20 and the remote assistance terminal 30 and to operate the vehicle 20 at the timing intended by the operator 40. In order to achieve this object, in a remote assistance method according to the embodiment of the present disclosure, a future image generated from vehicle information is displayed on the display device 32 of the remote assistance terminal 30 instead of an image in front of the vehicle 20 captured by the camera mounted on the vehicle 20. The future image displayed on the display device 32 is an image predicted to be realized at a future time. The vehicle information used to generate the future image includes the path plan of the vehicle 20 generated by the autonomous driving system and prediction information of the environment surrounding the vehicle 20 used to generate the path plan. Since the generation of the path plan and the prediction of the surrounding environment are basic known functions for the autonomous driving system, description thereof will be omitted. The vehicle 20 transmits the vehicle information to the remote assistance terminal 30 at least during a period from when the assistance is requested to when the assistance is completed.

In the remote assistance method according to the present embodiment, the remote assistance terminal 30 transmits the assistance content input by the operator 40 and the future information of the vehicle 20 generated by the computer 31 to the vehicle 20 via the server 10. The future information of the vehicle 20 generated by the computer 31 includes information related to a positional relationship between the vehicle 20 and an object present around the vehicle 20 at a future time in consideration of a delay time to be described later. Based on the received assistance content and future information, the computer 21 of the vehicle 20 determines whether or not the assistance can be executed at a timing when the assistance is actually required.

Hereinafter, an outline of the remote assistance method according to the present embodiment will be specifically described with reference to FIGS. 5 to 7. Here, a situation is assumed in which the vehicle 20 is about to turn right at the intersection and another vehicle 50 (here, referred to as the other vehicle) is entering the intersection from the opposite lane.

First, the overall outline of FIGS. 5 to 7 will be described. In the upper part of each of FIGS. 5 to 7, an image diagram showing the positional relationship between the vehicle 20 and the other vehicle 50 recognized from the image of the camera of the vehicle 20 is drawn. These image diagrams correspond to plan views obtained by converting the camera image shown in FIG. 4A. The five image diagrams shown in the upper part are all different in time, and are arranged in time series from left to right in the order of time T0, T11, T21, T31, and T41. However, the image captured by the camera of the vehicle 20 is a moving image, and the positional relationship between the vehicle 20 and the other vehicle 50 is also recognized in a continuous flow of time. Here, the positional relationship at a specific time in the continuous flow of time is merely picked up and shown.

The autonomous driving system of the vehicle 20 creates a path plan of the vehicle 20 based on the image of the camera, and calculates a predicted path of the other vehicle 50. In each image diagram, a solid line and a dotted arrow line extending from the vehicle 20 are path plans created by the autonomous driving system. The path plan includes a target position of the vehicle 20 in a coordinate system centered on the vehicle 20 or an absolute coordinate system, and a target velocity or a target acceleration at the target position. The solid line is a defined path plan, and the dotted line is an undefined path plan. A dashed arrow line extending from the other vehicle 50 is a predicted path of the other vehicle 50 calculated by the autonomous driving system.

Figure 5:
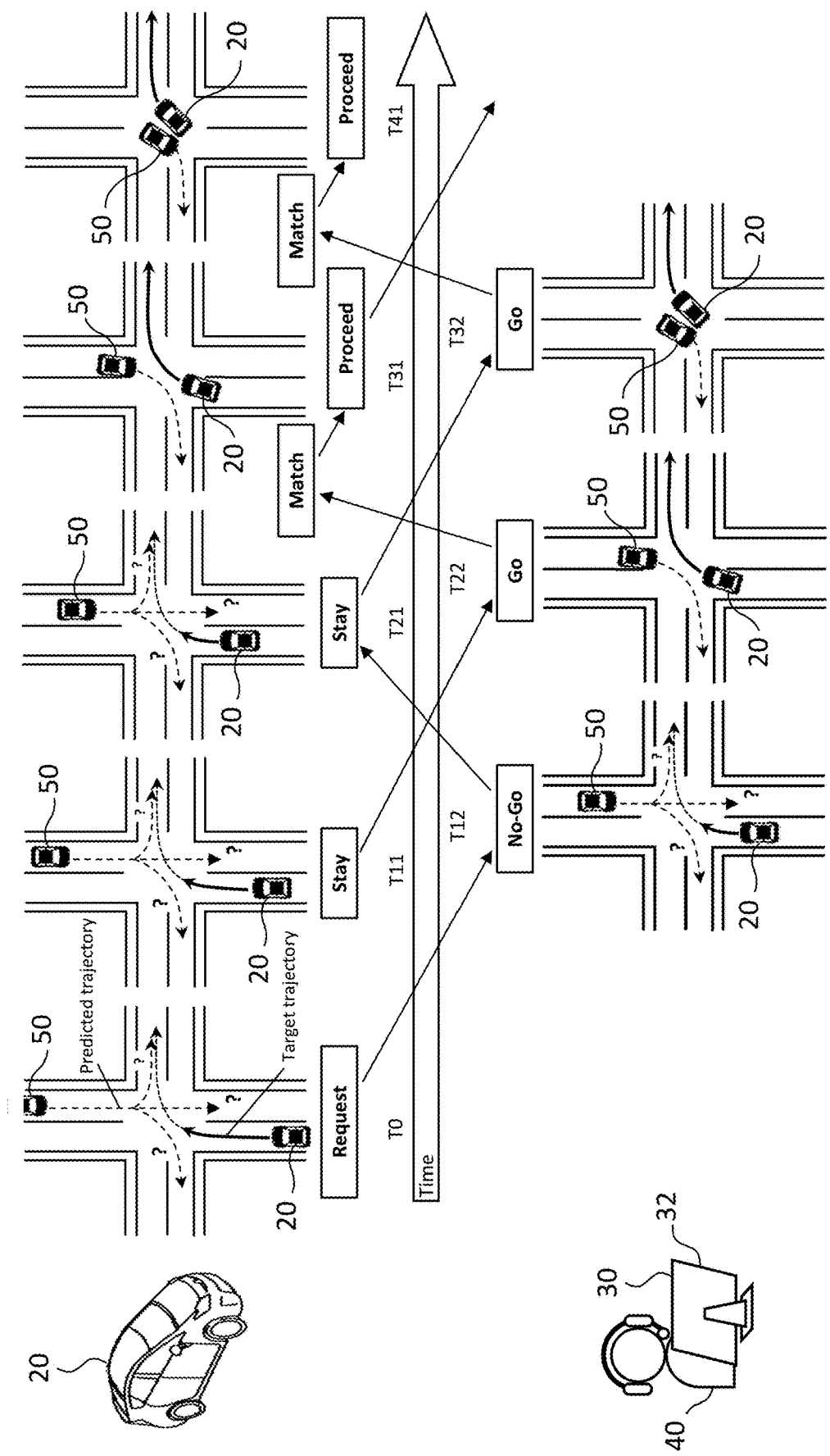
FIG. 5 is a diagram for explaining an outline of a remote assistance method according to an embodiment of the present disclosure.
Figure 6:
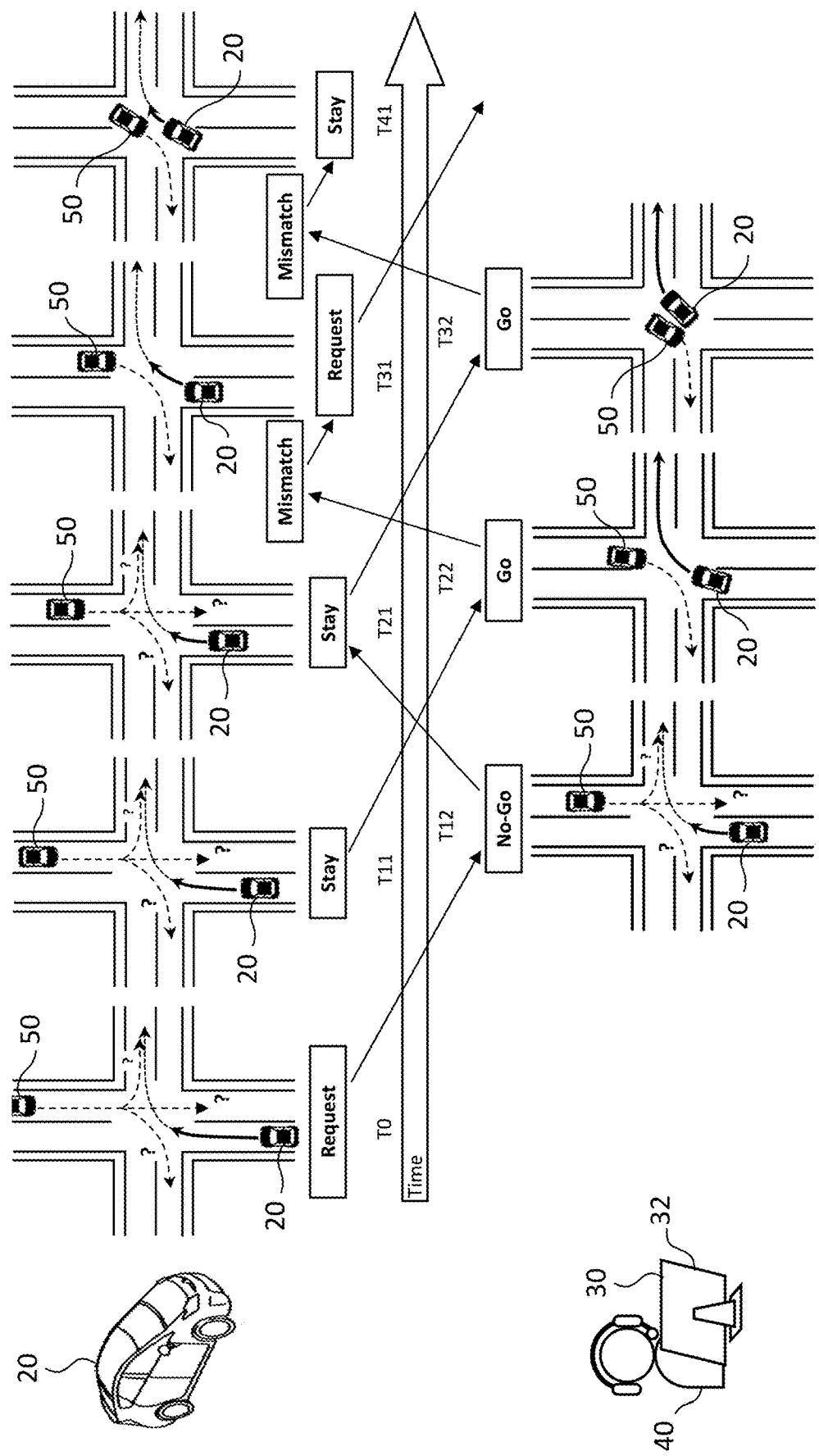
FIG. 6 is a diagram for explaining the outline of the remote assistance method according to the embodiment of the present disclosure.
Figure 7:
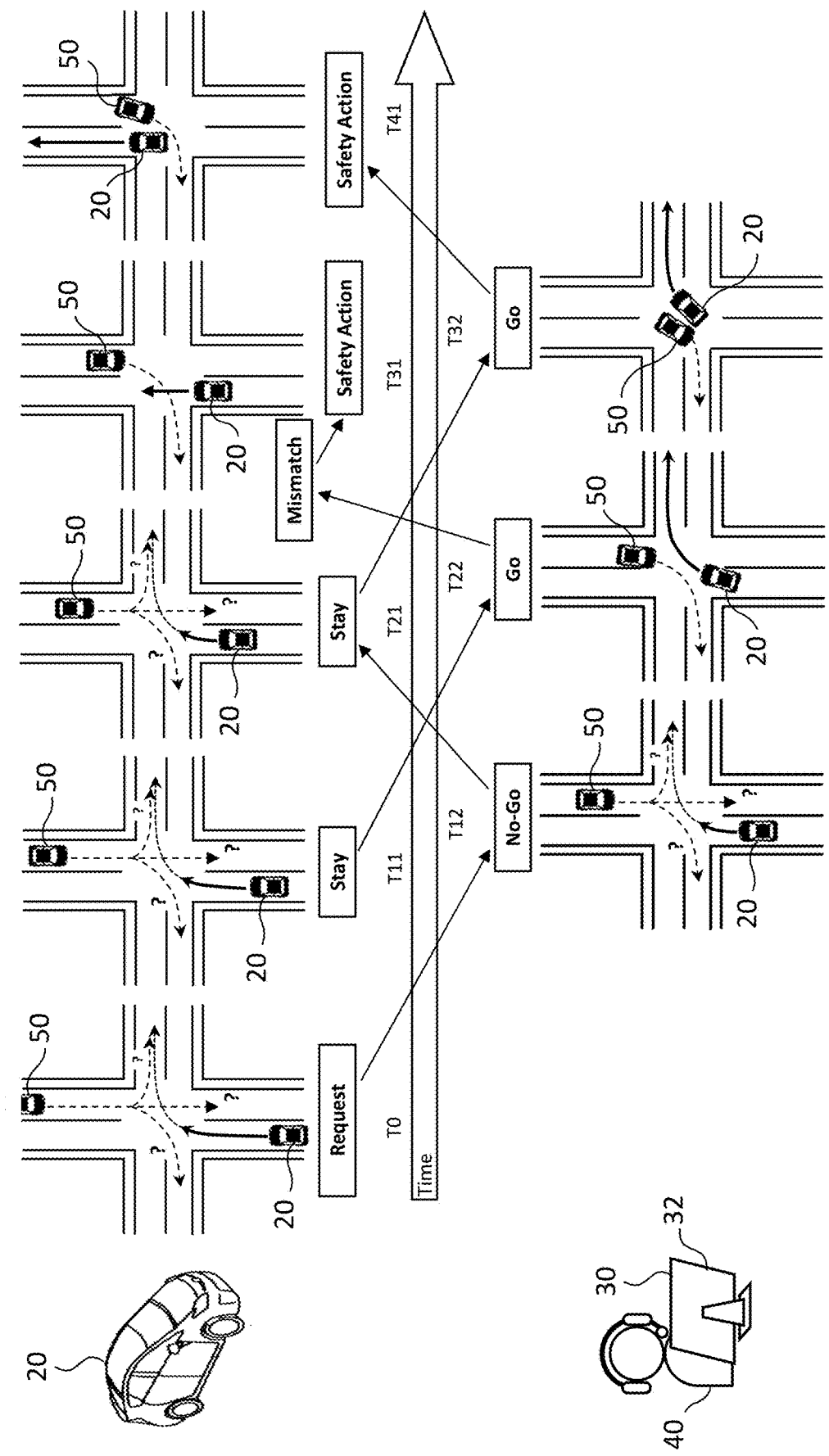
FIG. 7 is a diagram for explaining the outline of the remote assistance method according to the embodiment of the present disclosure.

An image diagram showing the positional relationship between the vehicle 20 and the other vehicle 50 spatially projected on the screen of the display device 32 of the remote assistance terminal 30 is depicted in the lower part of each of FIGS. 5 to 7. These image diagrams correspond to plan views obtained by converting 3D images as shown in FIG. 4B displayed on the display device 32. The three image diagrams shown in the lower part are all different in time, and are arranged in time series from left to right in the order of time T12, T22, and T32. However, the image displayed on the screen of the display device 32 is a moving image, and the positional relationship between the vehicle 20 and the other vehicle 50 in the screen continuously changes with time. Here, the positional relationship at a specific time in the continuous flow of time is merely picked up and shown.

The computer 31 of the remote assistance terminal 30 predicts the positional relationship between the vehicle 20 and the other vehicle 50 at a future time on the basis of the path plan of the vehicle 20 received from the vehicle 20 and the prediction information of the surrounding environment including the predicted path of the other vehicle 50. In each of the image diagrams, a solid line and a dotted arrow line extending from the vehicle 20 indicate the path plan received from the vehicle 20. A solid line indicates a path plan approved by the operator 40, and a dotted line indicates a path plan unapproved by the operator 40. A dashed arrow line extending from the other vehicle 50 is a predicted path of the other vehicle 50 at the future time predicted by the computer 31. For example, based on the map information and the velocity and direction of the other vehicle 50, the computer 31 predicts the probability that the other vehicle 50 will go straight ahead in the current driving lane, the probability that the other vehicle 50 will turn right, and the probability that the other vehicle 50 will turn left. When the object around the vehicle 20 is a pedestrian, the computer 31 divides the road into grids, for example, and calculates the probability that the pedestrian will pass on each grid using the velocity and direction of the pedestrian, thereby predicting the course of the pedestrian.

FIGS. 5 to 7 show examples of remote assistance implemented by the remote assistance method according to the embodiment of the present invention. The examples shown in each figure will be described in order from the example shown in FIG. 5.

In the example shown in FIG. 5, a request for assistance is issued from the vehicle 20 at the time T0. In this example, the assistance requested by the vehicle 20 is to determine whether or not to make a right turn at an intersection ahead.

The vehicle 20 requests assistance not after entering the intersection but before a predetermined distance from the intersection. At the time TO when the vehicle 20 requests assistance, it is unclear whether the other vehicle 50 in the opposite lane is going straight, turning left, or turning right. In such a situation, the autonomous driving system of the vehicle 20 does not make a determination by itself but leaves the determination to the operator 40 and waits for the determination result to be transmitted. However, while the assistance is being requested, the vehicle 20 does not completely stop at that location, but moves slowly to the vicinity of the center of the intersection at a low velocity in order to suppress the influence on the following vehicles.

In response to the assistance request from the vehicle 20, the server 10 assigns an operator 40, and the vehicle information including the path plan of the vehicle 20 and the predicted path of the other vehicle 50 is transmitted together with the assistance request to the remote assistance terminal 30 of the assigned operator 40. The computer 31 of the remote assistance device 30 generates a future image in consideration of the delay time based on the vehicle information and displays the generated future image on the display device 32 at the time T12. It takes time from when the image including the positional relationship between the vehicle 20 and the other vehicle 50 is acquired by the camera of the vehicle 20 to when the vehicle information transmitted from the vehicle 20 is received by the remote assistance terminal 30 and the future image can be displayed by the remote assistance terminal 30. This time is the delay time in the uplink direction.

The sum of the delay time in the uplink direction and the delay time in the downlink direction, which will be described later, is the delay time to be considered in generation of a future image. The delay time includes a communication delay, a calculation time of the computer 21 of the vehicle 20 and a calculation time of the computer 31 of the remote assistance terminal 30. The calculation time may be set to a fixed value, and the delay time may be determined based on the communication delay (for example, Round Trip Time) measured immediately before. Alternatively, the delay time may be given as a fixed value based on the past results. When the delay time is given as a fixed value, the value of the delay time may be changed depending on the time zone in consideration that the communication delay is different depending on the time zone.

The future image displayed on the display device 32 includes the positional relationship between the vehicle 20 and the other vehicle 50 at a future time beyond the current time (time T12). The display device 32 also displays what kind of assistance the vehicle 20 is requesting. The operator 40 determines whether or not the vehicle 20 may turn right at the intersection based on the positional relationship between the vehicle 20, the other vehicle 50 and the surrounding environment displayed on the display device 32 of the remote assistance terminal 30. The operator 40 operates the input device 33 of the remote assistance terminal 30 according to the determination result of the operator 40. In the example shown in FIG. 5, the traveling direction of the other vehicle 50 cannot be specified yet from the image displayed on the display device 32 at the time T12. Therefore, the operator 40 inputs No-Go that is suspension of execution of the right turn as the assistance content for the vehicle 50.

The assistance content input to the remote assistance terminal 30 is transmitted from the remote assistance terminal 30 to the vehicle 20. Further, the future information created by the remote assistance terminal 30, that is, the information on the positional relationship between the vehicle 20 and the other vehicle 50 at the future time is transmitted to the vehicle 20 together with the assistance content. Here, for simplicity, the time required for the determination by the operator 40 is ignored, and it is assumed that the assistance content and the future information are transmitted from the remote assistance terminal 30 to the vehicle 20 at the time T12. In the remote assistance system, since the determination time of the operator 40 is not included in the delay time in the uplink direction and the delay time in the downlink direction, the determination time of the operator 40 can be ignored.

It takes time from when the assistance content and the future information are transmitted from the remote assistance terminal 30 to when the assistance content and the future information are received by the vehicle 20 and the assistance content becomes executable by the vehicle 20. This time is the delay time in the downlink direction. The time T21 is a time that is later than the time at which the vehicle 20 transmits the vehicle information by the total delay time in the uplink direction and the downlink direction, and the vehicle 20 can execute the assistance content at the time T21. As described above, the future image displayed on the display device 32 of the remote assistance terminal 30 is created in consideration of the delay time. That is, the future image displayed on the display device 32 at the time T12 is created by predicting the actual positional relationship between the vehicle 20 and the other vehicle 50 at the time T21. Then, the positional relationship between the vehicle 20 and the other vehicle 50 at the time T12 predicted at the time T21 is transmitted to the vehicle 20 as future information.

Since the assistance content executed by the vehicle 20 at the time T21 is No-Go, the vehicle 20 does not execute the right turn and continues to be in the standby state. When the assistance content is the determination of Go, that is, the determination to move the vehicle 20 actively, the future information received by the vehicle 20 together with the assistance content is used for final determination of whether or not to perform remote assistance corresponding to the assistance content. Not limited to the scene of the right turn at the intersection, when the assistance content of the operator 40 with respect to the assistance request is No-Go, the vehicle 20 continues to be in the standby state regardless of the future information. However, when the determination of the vehicle 20 and the assistance content of the remote assistance match each other, the future information may not be used to determine whether to perform the remote assistance according to the assistance content. Further, the vehicle 20 transmits the latest vehicle information at the time T21 to the remote assistance terminal 30.

After issuing the assistance request at the time T0, the vehicle 20 continuously transmits the vehicle information to the remote assistance terminal 30. Therefore, even at the time T11 between the time T0 at which the assistance request is issued and the time 21 at which the assistance content is executed, the vehicle 20 transmits the vehicle information at the time T11 to the remote assistance terminal 30.

The computer 31 of the remote assistance device 30 generates a future image in consideration of the delay time based on the vehicle information transmitted from the vehicle 20 at the time T11, and displays the generated future image on the display device 32 at the time T22. The future image displayed on the display device 32 at the time T22 is an image obtained by predicting the positional relationship between the vehicle 20 and the other vehicle 50 at a future time (time T31) beyond the current time (time T22). From the image displayed at the time T22, it can be determined that the other vehicle 50 is going to turn right at the intersection. When the other vehicle 50 turns right at the intersection, the vehicle 20 can safely turn right without causing interference with the other vehicle 50. Therefore, the operator 40 inputs execution of turning right (Go) as the assistance content for the vehicle 50.

The vehicle information transmitted from the vehicle 20 is continuously input to the remote assistance terminal 30. At the time T32, a future image generated based on the vehicle information transmitted from the vehicle 20 at the time T21 is displayed on the display apparatus 32. The future image displayed on the display device 32 at the time T32 is an image obtained by predicting the positional relationship between the vehicle 20 and the other vehicle 50 at a future time (time T41) beyond the current time (time T32). From the image displayed at the time T32, it can be seen that the other vehicle 50 is turning right at the intersection. If the other vehicle 50 is also in the middle of turning right, the right turn of the vehicle 20 can be continued without any problem. Therefore, the operator 40 inputs execution of turning right (Go) as the assistance content for the vehicle 50.

The assistance content input to the remote assistance terminal 30 by the operator 40 at the time T22 is transmitted to the vehicle 20 together with the future information created by the remote assistance terminal 30 at the time T22. The future information received by the vehicle 20 includes the positional relationship between the vehicle 20 and the other vehicle 50 at the time T31 predicted at the time T22. Since the assistance content transmitted from the operator 40 is the determination of Go, the vehicle 20 refers to the future information and determines whether or not to execute remote assistance according to the assistance content.

In the determination of whether or not the remote assistance can be executed by the vehicle 20, it is confirmed whether or not the positional relationship between the vehicle 20 and the other vehicle 50 displayed on the display device 32 when the operator 40 inputs the assistance content to the remote assistance terminal 30 is actually realized. As a confirmation method, for example, a degree of coincidence between the positional relationship between the vehicle 20 and the other 50 in the future image displayed on the display device 32 at the time T22 (hereinafter referred to as a future positional relationship) and the actual positional relationship between the vehicle 20 and the other vehicle 50 realized at the time T31 is determined. The future positional relationship is included in the future information transmitted from the remote assistance terminal 30. The actual positional relationship between the vehicle 20 and the other vehicle 50 can be acquired by the camera of the vehicle 20. A method of calculating the degree of coincidence will be described in detail later. When the degree of coincidence is equal to or greater than the predetermined value, the vehicle 20 determines that it is confirmed that the future positional relationship predicted at the time T22 is realized at the time T31.

In response to the confirmation, the vehicle 20 performs remote assistance according to the assistance content. In the example illustrated in FIG. 5, the remote assistance corresponding to the determination of Go of the assistance content is execution of turning right. At the time T31, the autonomous driving system of the vehicle 20 determines a path plan to turn right at the intersection, and executes the right turn. The delay time in the downlink direction also includes a time for confirming that the predicted future positional relationship is realized.

The assistance content and the future information transmitted from the remote assistance terminal 30 are continuously input to the vehicle 20. The future information transmitted from the remote assistance terminal 30 at the time T32 includes the positional relationship between the vehicle 20 and the other vehicle 50 at the time T41 predicted at the time T32. Since the assistance content transmitted from the remote assistance terminal 30 at the time T32 is the determination of Go, the vehicle 20 determines the degree of coincidence between the future positional relationship predicted by the remote assistance terminal 30 at the time T32 and the actual positional relationship between the vehicle 20 and the other vehicle 50 realized at the time T41. In the example shown in FIG. 5, since the degree of coincidence is equal to or greater than the threshold value, the vehicle 20 continues to turn right in accordance with the determination of Go by the operator 40.

Next, a description will be given of processing in a case where the future positional relationship predicted by the remote assistance terminal 30 is not actually realized and remote assistance corresponding to the assistance content input by the operator 40 cannot be executed. In the example shown in FIG. 6, the future positional relationship predicted by the remote assistance device 30 at the time T22 does not match the actual positional relationship between the vehicle 20 and the other vehicle 50 realized at the time T31. In this case, the vehicle 20 does not follow the determination of Go of the assistance content transmitted from the remote assistance terminal 30 at the time T22. That is, the vehicle 20 does not make a right turn and continues to be in the standby state. In addition, at the time T31, the vehicle 20 requests the operator 40 to provide assistance again. In this example, the assistance requested again by the vehicle 20 is a determination as to whether the vehicle 20 may continue to make a right turn.

The assistance content and the future information transmitted from the remote assistance terminal 30 are continuously input to the vehicle 20. In the example shown in FIG. 6, the future positional relationship predicted by the remote assistance device 30 at the time T32 does not match the actual positional relationship between the vehicle 20 and the other vehicle 50 realized at the time T41. Therefore, the vehicle 20 does not follow the determination of Go by the operator 40 and continues to be in the standby state. When assistance is requested again from the vehicle 20 to the operator 40 at the time T31, new assistance content and future information are input from the remote assistance terminal 30 to the vehicle 20 even after the time T41. When the remote assistance terminal 30 confirms that the predicted future positional relationship is actually realized, the vehicle 20 makes a right turn in accordance with the determination of Go by the operator 40.

In a case where the future positional relationship predicted by the remote assistance terminal 30 is not realized in reality and remote assistance corresponding to the assistance content input by the operator 40 cannot be executed, in the example illustrated in FIG. 6, assistance is requested again from the vehicle 20 to the operator 40. However, depending on the situation in which the vehicle 20 is placed, it is not possible to re-request the operator 40 to provide assistance. For example, in a situation where the color of the traffic light in the direction of travel is likely to change from blue to red, it is not possible to keep waiting in the intersection.

In the example shown in FIG. 7, the future positional relationship predicted by the remote assistance device 30 at the time T22 does not match the actual positional relationship between the vehicle 20 and the other vehicle 50 realized at the time T31. In this case, the vehicle 20 does not follow the determination of Go of the assistance content transmitted from the remote assistance terminal 30 at the time T22. However, there is no situation in which it is possible to continue to be in the standby state in the intersection while re-requesting assistance to the operator 40. In this case, the vehicle 20 selects a path that can ensure safety. In the example shown in FIG. 7, at the time T31, the vehicle 20 abandons the right turn and selects a path that goes straight through the intersection.

The assistance content and the future information transmitted from the remote assistance terminal 30 are continuously input to the vehicle 20. In the example shown in FIG. 7, the assistance content and the future information transmitted from the remote assistance terminal 30 at the time T32 are input to the vehicle 20. However, since the vehicle 20 has already selected a path that can ensure safety, the assistance content transmitted from the remote assistance terminal 30 is not executed. The vehicle 20 continuously selects a path that can ensure safety even at the time T41.

As described above, according to the remote assistance method of the present embodiment, the remote assistance corresponding to the assistance content input by the operator 40 is executed in the vehicle 20 on condition that it is confirmed that the positional relationship between the vehicle 20 and the other vehicle 50 displayed on the display device 32 when the assistance content is input by the operator 40 is realized. That is, until the above confirmation is obtained, even if the vehicle 20 receives the assistance content, the remote assistance corresponding to the assistance content is not executed in the vehicle 20. According to this, it is possible to operate the vehicle 20 at the timing intended by the operator 40 by eliminating the influence of the shift in the assistance timing caused by the delay time including the communication delay. Therefore, it is possible to improve the reliability of the determination of the operator 40.

3. Method of Calculating Degree of Coincidence 3-1. First Example

Figure 8:
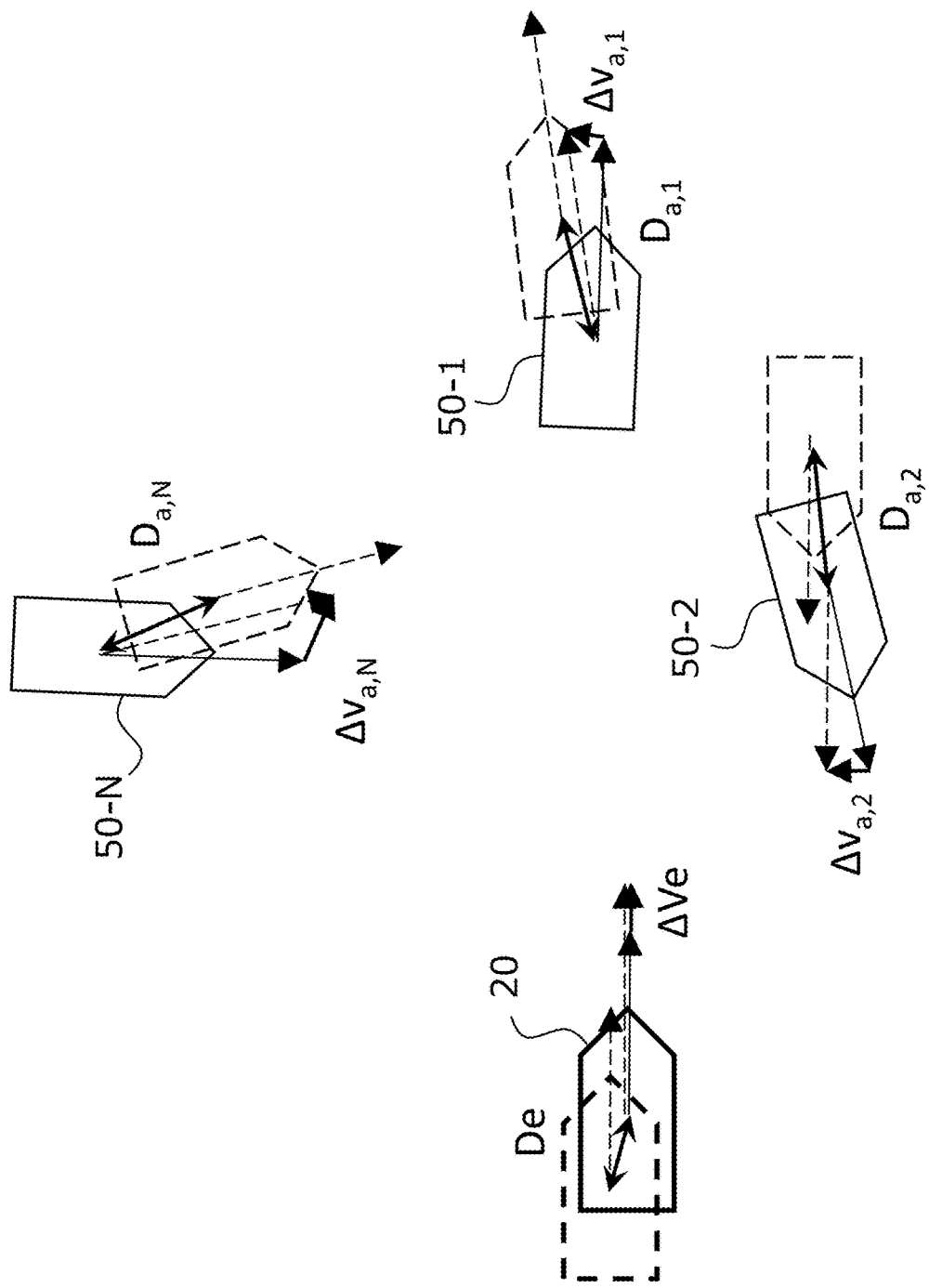
FIG. 8 is a diagram for explaining a first example of a method of calculating the degree of coincidence.

Three examples of a method of calculating the degree of coincidence will be described. FIG. 8 is a diagram for explaining a first example of a method of calculating the degree of coincidence. FIG. 8 schematically illustrates the vehicle 20 and objects 50-1, 50-2, . . . , and 50-N around the vehicle 20. Although not shown, it is assumed that there are N objects around the vehicle 20. Surrounding objects include all moving objects such as vehicles, pedestrians, and bicycles. The positions of the vehicle 20 and the peripheral objects 50-1, 50-2, . . . , and 50-N indicated by broken lines are predicted positions referred to by the operator 40 in the determination of the assistance content, and the positions indicated by solid lines are actual positions when the vehicle 20 executes the assistance content.

In the first example, the degree of coincidence is expressed using the following function. The following function is configured such that the smaller the error between the predicted position and the actual position, the closer to 0 the value. For example, a calculation formula for the degree of coincidence may be created such that the degree of coincidence is maximized when the value of the following function is 0.

$$\{(\Box_\Box \times \Box_\Box + \Box_\Box \times |\Delta\Box_\Box|) + \Sigma_{\Gamma=1\sim\Gamma}(\Box_{\sqcup,\sqcup} \times \Box_{\Box,\Box} + \Box_{\Box,\Box} \times |\Delta\Box_{\Box,\Box}|)\}/(1+\Box)$$

In the above function, De represents the amount of change between the current position and the future position of the vehicle 20. $\Delta$Ve represents the amount of change between the current velocity of the vehicle 20 and the future velocity predicted from the path plan. Further, Da,i represents the amount of change between the current position and the future position of the object 50-$i$. $\Delta$Va,i represents the amount of change between the current velocity of the object 50-$i$ and the future velocity predicted by the autonomous driving system. $\alpha$e, $\beta$e, $\alpha$a,i, and $\beta$a,i are coefficients. In the above function, the term of De and the term of $\Delta$Ve related to the vehicle 20 may be omitted. In this case, the denominator 1+N may be set to N.

The objects 50-1, 50-2, . . . , and 50-N to be calculated in the calculation of the above function are determined in accordance with the determination content of the operator 40 and the scene. For example, in the example shown in FIG. 8, only the object 50-1 moving in front of the traveling direction the vehicle 20 may be set as a calculation target. It is also possible to limit the calculation target only to a specific object, for example, a moving object on a road, a vehicle on an opposite lane, a vehicle approaching the ego-vehicle, or a vehicle in general. In addition, it is possible to exclude a specific object, for example, a following vehicle or a pedestrian from the calculation target.

In the examples shown in FIGS. 5 to 7, although an object other than the other vehicle 50 may be present around the vehicle 20, only the other vehicle 50 affects the determination of the behavior of the vehicle 20 when turning right at the intersection. Therefore, in the example shown in FIGS. 5 to 7, when the above-described function is used for calculation of the degree of coincidence, only the other vehicle 50 is set as a calculation target.

It should be noted that the values of the coefficient $\alpha$a,i and the coefficient $\beta$a,i may be changed in accordance with the magnitude of the influence on the determination of the behavior of the vehicle 20 after adding all objects existing within a certain range from the vehicle 20 to the calculation target. For example, a coefficient given to an object in a direction approaching the vehicle 20 may be larger than a coefficient given to an object in a direction away from the vehicle 20.

3-2. Second Example

The second example is an example in which Time to Collision (TTC) is used to determine the degree of coincidence. In the second example, with respect to the object interfering with the path of the vehicle 20, the predicted TTC in the future positional relationship displayed on the display device 32 and the actual TTC in the actual positional relationship when the vehicle 20 executes the assistance content are calculated. When multiple objects are present in the path of the vehicle 20, the objects closest to the front and the rear are regarded as the objects interfering with the vehicle 20. When the error between the predicted TTC and the actual TTC is within the threshold value, it is determined that the degree of coincidence is high. In the second example, a relative distance or a relative velocity may be used instead of the TTC.

Figure 9:
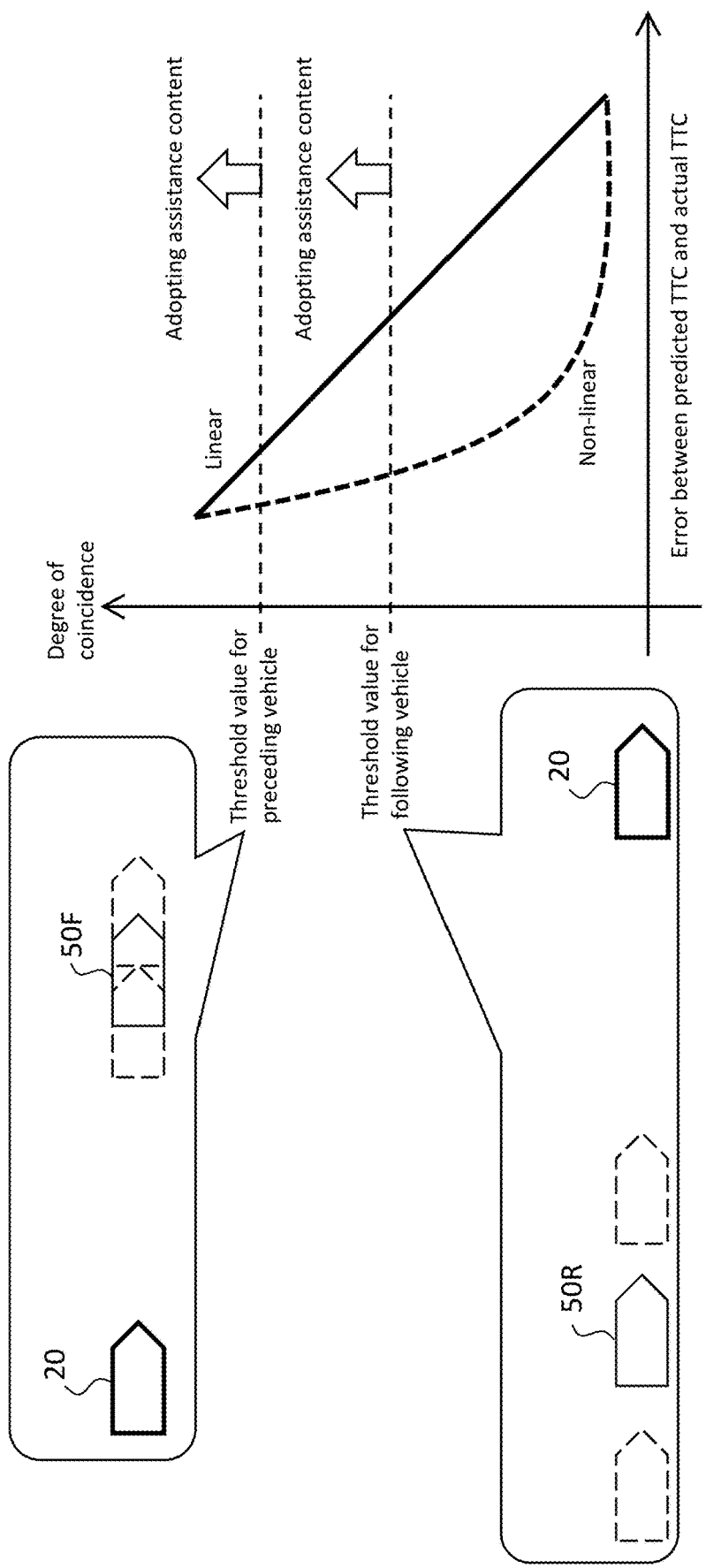
FIG. 9 is a diagram for explaining a second example of the method of calculating the degree of coincidence.

FIG. 9 is a diagram for explaining the second example of the method of calculating the degree of coincidence in more detail. In the second example, the threshold for determining the degree of coincidence using the assistance content is changed depending on whether the vehicle interfering with the path of the vehicle 20 is a preceding vehicle 50F or a following vehicle 50R. The positions of the preceding vehicle 50F and the following vehicle 50R indicated by broken lines are predicted positions referred to by the operator 40 in the determination of the assistance content, and the positions indicated by solid lines are actual positions when the vehicle 20 executes the assistance content. As shown in the graph and schematic diagram in FIG. 9, the threshold for determining the degree of coincidence is set higher for the preceding vehicle 50F and lower for the following vehicle 50R. The relationship between the error between the predicted TTC and the actual TTC and the degree of coincidence may be set linearly as shown in the graph or may be set non-linearly. Even when the relative distance or the relative velocity is used instead of the TTC, the relationship between the error and the degree of coincidence can be set in any manner as long as the degree of coincidence increases as the error decreases.

Figure 10:
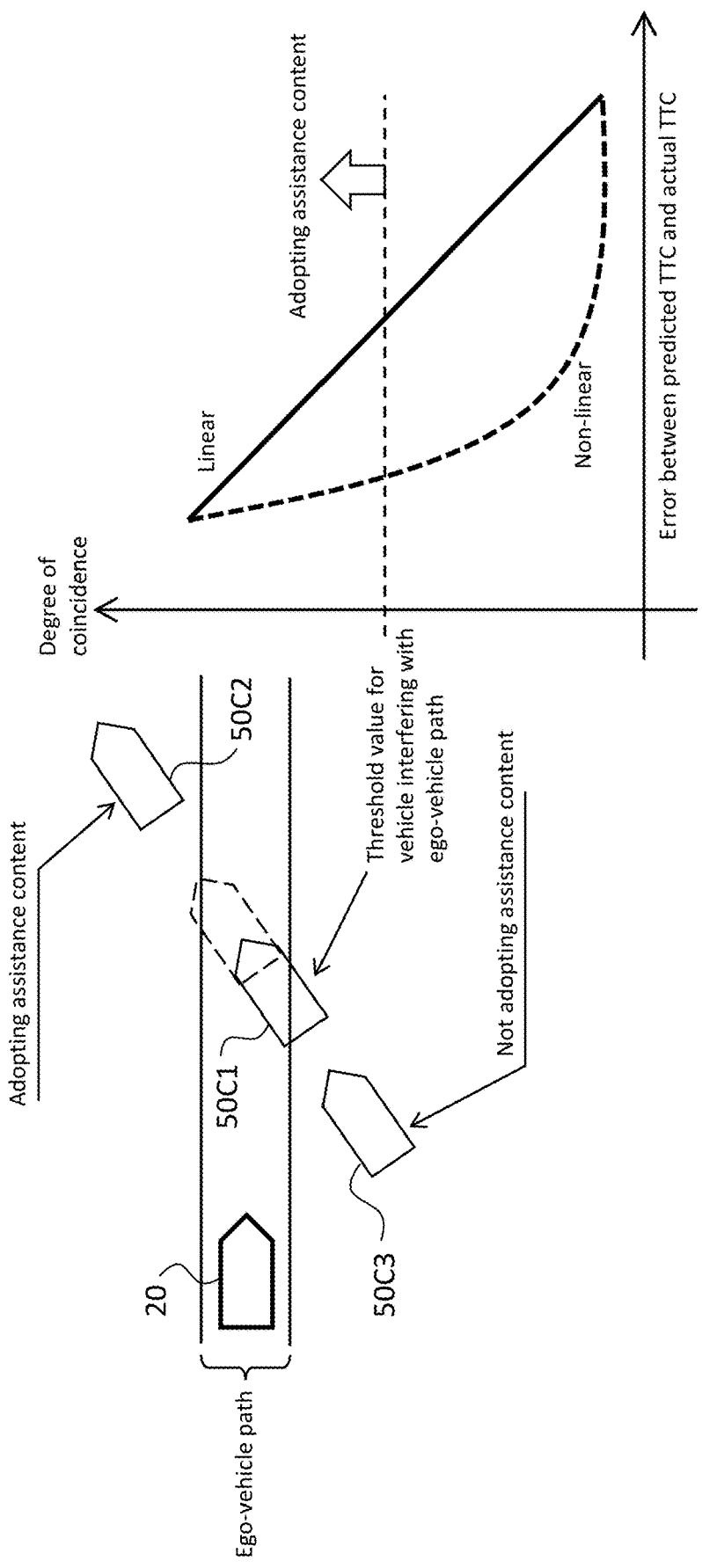
FIG. 10 is a diagram for explaining the second example of the method of calculating the degree of coincidence.

Here, the "object interfering with the path of the vehicle 20" which is the calculation target of the degree of coincidence in the second example will be described in more detail. The preceding vehicle 50F and the following vehicle 50R shown in FIG. 9 are objects that are continuously present on the path of the vehicle 20. However, in an actual situation, as schematically shown in FIG. 10, an object may cross the path of the vehicle 20 in an extremely short time. In the determination of whether or not the object interferes with the path of the vehicle 20, a certain width (for example, a width approximately equal to the width of the vehicle 20) is given to the path of the vehicle 20.

When an object crosses the path of the vehicle 20, whether or not the object interferes with the path of the vehicle 20 depends on the actual position of the object when the assistance content is executed. For example, the crossing vehicle 50C1 in which the predicted position referred to by the operator 40 in the determination of the assistance content interferes with the path as indicated by the broken line and the actual position when the assistance content is executed also interferes with the path as indicated by the solid line is set as the calculation target of the degree of coincidence in the second example. That is, the error between the predicted TTC and the actual TTC is calculated for the crossing vehicle 50C1, and the degree of coincidence is calculated from the error according to the graph shown in FIG. 10. When the degree of coincidence is equal to or greater than the threshold value, the vehicle 20 adopts and executes the assistance content. Even in a case where an object crosses the path of the vehicle 20, the relative distance or the relative velocity may be used instead of the TTC.

On the other hand, the crossing vehicle 50C2 in which the predicted position referred to by the operator 40 in the determination of the assistance content interferes with the path but the actual position at the time of executing the assistance content passes through the path is excluded from the calculation target of the degree of coincidence in the second example. In this case, since the vehicle 20 and the crossing vehicle 50C2 do not interfere with each other, the vehicle 20 adopts and executes the assistance content without calculating the degree of coincidence. On the other hand, the crossing vehicle 50C3 in which the predicted position referred to by the operator 40 in the determination of the assistance content interfere with the path but the actual position when the assistance content is executed does not yet interfere with the path is also excluded from the calculation target of the degree of coincidence in the second example. In this case, the vehicle 20 does not adopt the assistance content without calculating the degree of coincidence.

3-3. Third Example

The third example is an example in which the Mahalanobis distance is used to determine the degree of coincidence.

In a case where the vehicle 20 predicts positions and velocities of peripheral objects and generates a path plan in consideration of uncertainty of the predicted values, it is appropriate to calculate a deviation between the predicted values and the actual measurement values with reference to the uncertainty. In this case, the Mahalanobis distance can be used as a method of calculating the deviation. The Mahalanobis distance M for each object I around the vehicle 20 is given by the following equation.

$$M(\vec{X}_i) = \sqrt{\vec{X}_i^T S_i \vec{X}_i}$$

Here, Si is a covariance matrix representing the uncertainty of the predicted value of the object i, and $\vec{X}_i$ is the deviation between the predicted value given by the exclusive OR of Di and ΔVi and the actual measured value. Even in a case where the deviation $\vec{X}_i$ between the predicted value and the actual measured value is slightly large, it can be expected that a large problem does not occur in the operation by the autonomous driving system when the uncertainty of the predicted value given by Si is sufficiently large and the uncertainty is included in the path plan of the vehicle 20. It can be said that the definition by $M(\vec{X}_i)$ is an index of the degree of coincidence reflecting how much uncertainty of the predicted value is included in the path plan of the vehicle 20.

4. Configuration of Remote Assistance System

Figure 11:
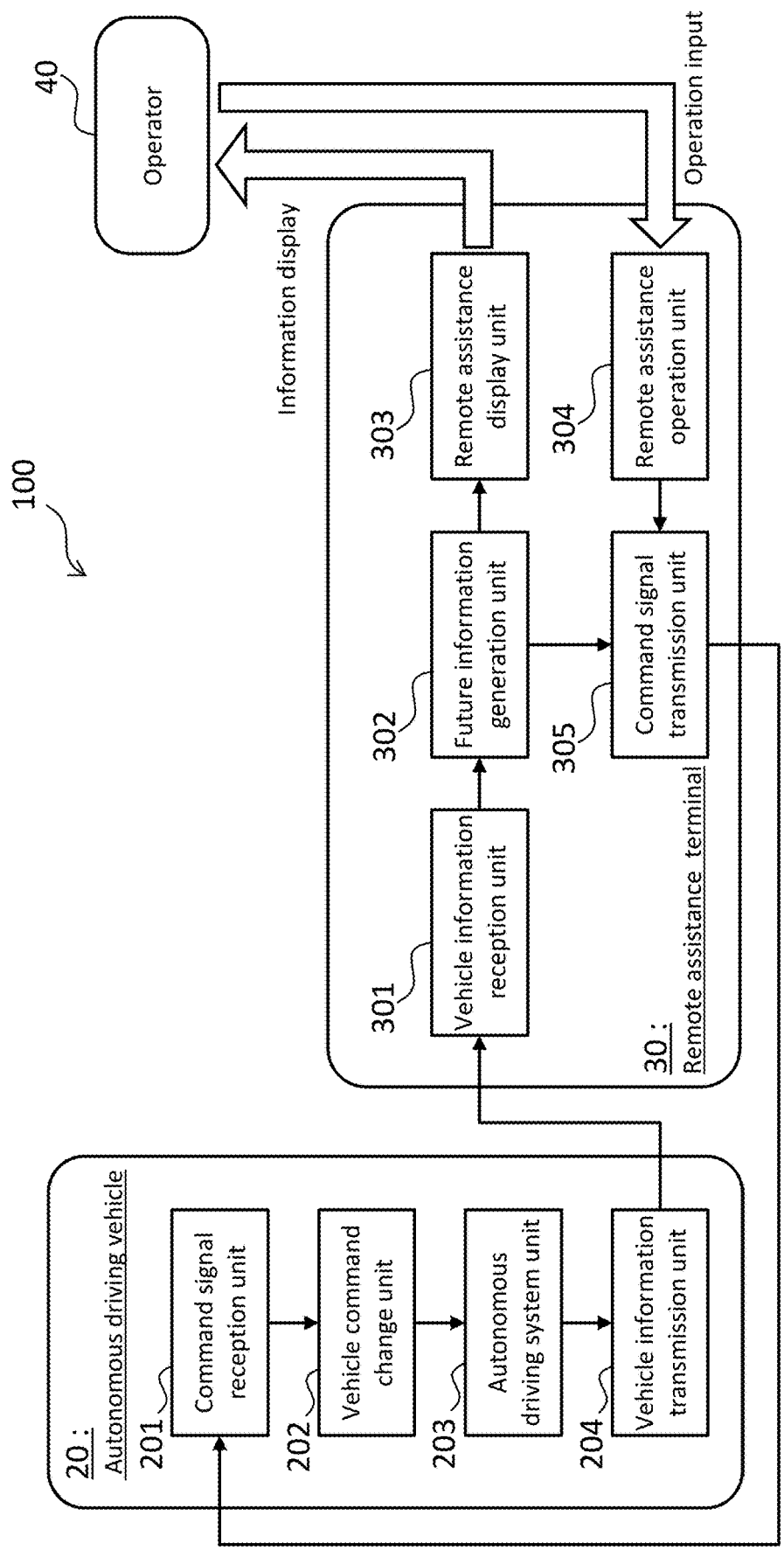
FIG. 11 is a block diagram illustrating a configuration of a remote assistance system according to the embodiment of the present disclosure.

A configuration of the remote assistance system according to the embodiment of the present disclosure will be described. FIG. 11 is a block diagram showing a configuration of a remote assistance system according to the present embodiment. The remote assistance system 100 includes a vehicle 20 and a remote assistance terminal 30. However, the remote assistance system 100 may include the server 10 that relays between the vehicle 20 and the remote assistance terminal 30, and may further include a communication network that connects the vehicle 20 and the remote assistance terminal 30.

First, the functions of the remote assistance terminal 30 will be described. The remote assistance terminal 30 includes a vehicle information reception unit 301, a future information generation unit 302, a remote assistance display unit 303, a remote assistance operation unit 304, and a command signal transmission unit 305. These are realized as functions of the remote assistance device 30 as the operator UI management system when the program 31c stored in the memory 31b of the computer 31 physically constituting the remote assistance device 30 is executed by the processor 31a.

The vehicle information reception unit 301 communicates with the vehicle 20 via the communication device 35. The vehicle information reception unit 301 acquires an assistance request and vehicle information for remote assistance issued by the vehicle 20.

The future information generation unit 302 generates future information related to states of the vehicle 20 and a peripheral object (a vehicle, a pedestrian, and the like) around the vehicle 20 at a future time beyond the current time based on the vehicle information transmitted from the vehicle 20. To generate the future information, specifically, the transmission time at which the vehicle 20 transmits the vehicle information, the path plan, the prediction information, and the recognition information included in the vehicle information, and the reception time at which the vehicle information reception unit 301 receives the vehicle information are used. The future time may be a time in the future by the total delay time in the uplink direction and the downlink direction or may be a time in the future by a preset time. Although the time used for the determination by the operator 40 is not included in the delay time, an average determination time may be added to the future time as a buffer.

The remote assistance display unit 303 displays the future information generated by the future information generation unit 302 on the display device 32. The future information includes a positional relationship between the vehicle 20 and a peripheral object around the vehicle 20 at a future time beyond the current time, and the positional relationship is spatially displayed on the screen of the display device 32. The operator 40 can arbitrarily select between a display by a three-dimensional model as shown in FIG. 4B and a display by a two-dimensional image for the display by the display device 32. In the display by the three-dimensional model, for example, when it is necessary to grasp an object near a specific place such as near a crosswalk, the viewpoint in the three-dimensional space can be moved and rotated so that the operator 40 can easily view the vicinity. In addition, when there is a possibility that occlusion exists in the vicinity of a place where assistance is required, the viewpoint can be moved and rotated to a place where occlusion is likely to exist. When the display by the two-dimensional image is used, it is possible to adopt a method of increasing the resolving power of the image, changing the image quality and the number of pixels, enlarging the image, switching to panorama display, switching the display destination to another display apparatus, or the like.

The remote assistance operation unit 304 receives an operation by the operator 40 input to the input device 33. The operator determines the assistance content for the vehicle 20 based on the future information displayed on the display device 32 by the remote assistance display unit 303, and inputs the permission determination of Go or No-Go or the detailed content thereof to the input device 33. The remote assistance operation unit 304 transmits the assistance content input to the input device 33 to the command signal transmission unit 305.

The command signal transmission unit 305 communicates with the vehicle 20 through the communication device 35. The command signal transmission unit 305 transmits the future information generated by the future information generation unit 302 and the assistance content determined by the operator 40 using the future information to the vehicle 20.

Next, functions of the vehicle 20 will be described. The vehicle 20 includes a command signal reception unit 201, a vehicle command change unit 202, an autonomous driving system unit 203, and a vehicle information transmission unit 204. These are realized as functions of the computer 21 when the program 21c stored in the memory 21b of the computer 21 is executed by the processor 21a.

The command signal reception unit 201 communicates with the remote assistance terminal 30 through the communication device 25. The command signal reception unit 201 receives the assistance content and the future information transmitted from the remote assistance terminal 30.

The vehicle command change unit 202 extracts information that needs to be changed based on the assistance content and the future information obtained by the command signal reception unit 201, and converts the extracted information into signal information that can be received by the autonomous driving system unit 203. Specifically, when the assistance content obtained by the command signal reception unit 201 is the determination of Go to permit the action, the vehicle command change unit 202 compares the positional relationship between the vehicle 20 and the peripheral object included in the future information with the positional relationship between the vehicle 20 and the peripheral object when the assistance content is actually executed. As a result of the comparison, when both do not match, that is, when the degree of coincidence between both is less than a threshold value, the vehicle command change unit 202 determines that execution of the assistance content is not allowed. If the degree of coincidence between both is equal to or greater than the threshold value, the vehicle command change unit 202 permits execution of the assistance content and transmits the assistance content to the autonomous driving system unit 203.

The autonomous driving system unit 203 is a function as an autonomous driving system of the computer 31. During traveling by normal autonomous driving, the autonomous driving system unit 203 recognizes a peripheral object on the basis of information on the surrounding environment obtained by the external sensor 22, and calculates a path along which the vehicle 20 travels while predicting a behavior of the recognized peripheral object. Then, when it becomes difficult to determine only with the autonomous driving system unit 203 or when it is likely to become difficult to determine only with the autonomous driving system unit 203, a request for remote assistance is output. When receiving the remote assistance, the autonomous driving system unit 203 performs calculation for executing the assistance content transmitted from the vehicle command change unit 202.

The vehicle information transmission unit 204 communicates with the remote assistance terminal 30 through the communication device 25. When the remote assistance is requested, the vehicle information transmission unit 204 transmits the assistance request and the vehicle information necessary for the remote assistance to the server 10. After the operator 40 in charge of assisting the vehicle 20 is assigned by the server 10, the vehicle information is transmitted together with the assistance request to the remote assistance terminal 30 of the operator 40 via the server 10.

5. Processing in Remote Assistance System

Figure 12:
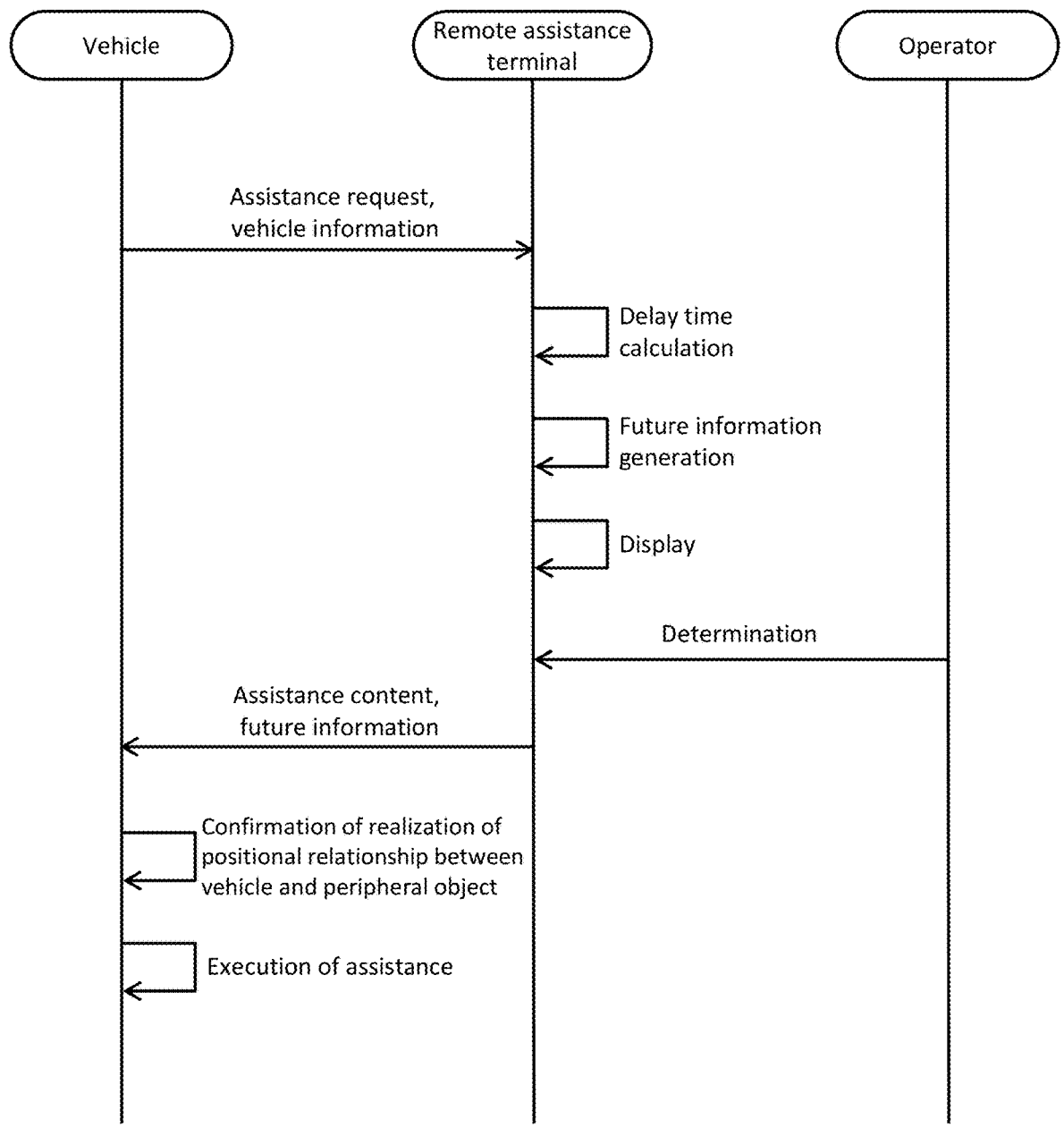
FIG. 12 is a sequence diagram illustrating a flow of processing among a vehicle, a remote assistance terminal, and an operator by the remote assistance system according to the embodiment of the present disclosure.

The flow of processing in the remote assistance system 100 configured as described above is shown in FIG. 12. FIG. 12 is a sequence diagram showing a flow of processing among the vehicle 20, the remote assistance terminal 30, and the operator 40 by the remote assistance system 100.

First, an assistance request and vehicle information are transmitted from the vehicle information transmission unit 204 of the vehicle 20. Specifically, the assistance request is once received by the server 10, and is transmitted to the remote assistance terminal 30 of the operator 40 together with the vehicle information after the operator 40 in charge of assisting the vehicle 20 is assigned. The assistance request and the vehicle information are received by the vehicle information reception unit 301 of the remote assistance terminal 30.

The future information generation unit 302 of the remote assistance terminal 30 that has received the assistance request calculates a delay time for calculating the future information. However, when a fixed value is used as the delay time, this processing is unnecessary.

A future information generation unit 302 of the remote assistance terminal 30 generates future information on the states of the vehicle 20 and the peripheral object at a future time beyond the current time based on the delay time and the vehicle information.

The remote assistance display unit 303 of the remote assistance terminal 30 displays the future information generated by the future information generation unit 302 on the display device 32. From the future information displayed on the display device 32, the operator 40 can grasp the positional relationship between the vehicle 20 and the peripheral object at the future time and determine the assistance content for the assistance request.

The operator 40 inputs the determined assistance content to the input device 33. The remote assistance operation unit 304 of the remote assistance terminal 30 receives the assistance content input to the input device 33.

The command signal transmission unit 305 of the remote assistance terminal 30 transmits the assistance content received by the remote assistance operation unit 304 to the vehicle 20 together with the future information generated by the future information generation unit 302. The assistance content and the future information are received by the command signal reception unit 201 of the vehicle 20.

Based on the future information input from the remote assistance terminal 30, the vehicle command change unit 202 of the vehicle 20 confirms that the positional relationship between the vehicle 20 and the peripheral object displayed on the display device 32 when the assistance content is input is realized.

In response to the confirmation, the autonomous driving system unit 203 of the vehicle 20 executes the remote assistance according to the assistance content. In other words, the remote assistance corresponding to the assistance content is not executed in the vehicle 20 until the above-described confirmation is obtained. By the remote assistance system 100 executing the above-described processing, the vehicle 20 can be operated at the timing intended by the operator 40.

Next, processing by the remote assistance terminal 30 and processing by the vehicle 20 will be described separately.

Figure 13:
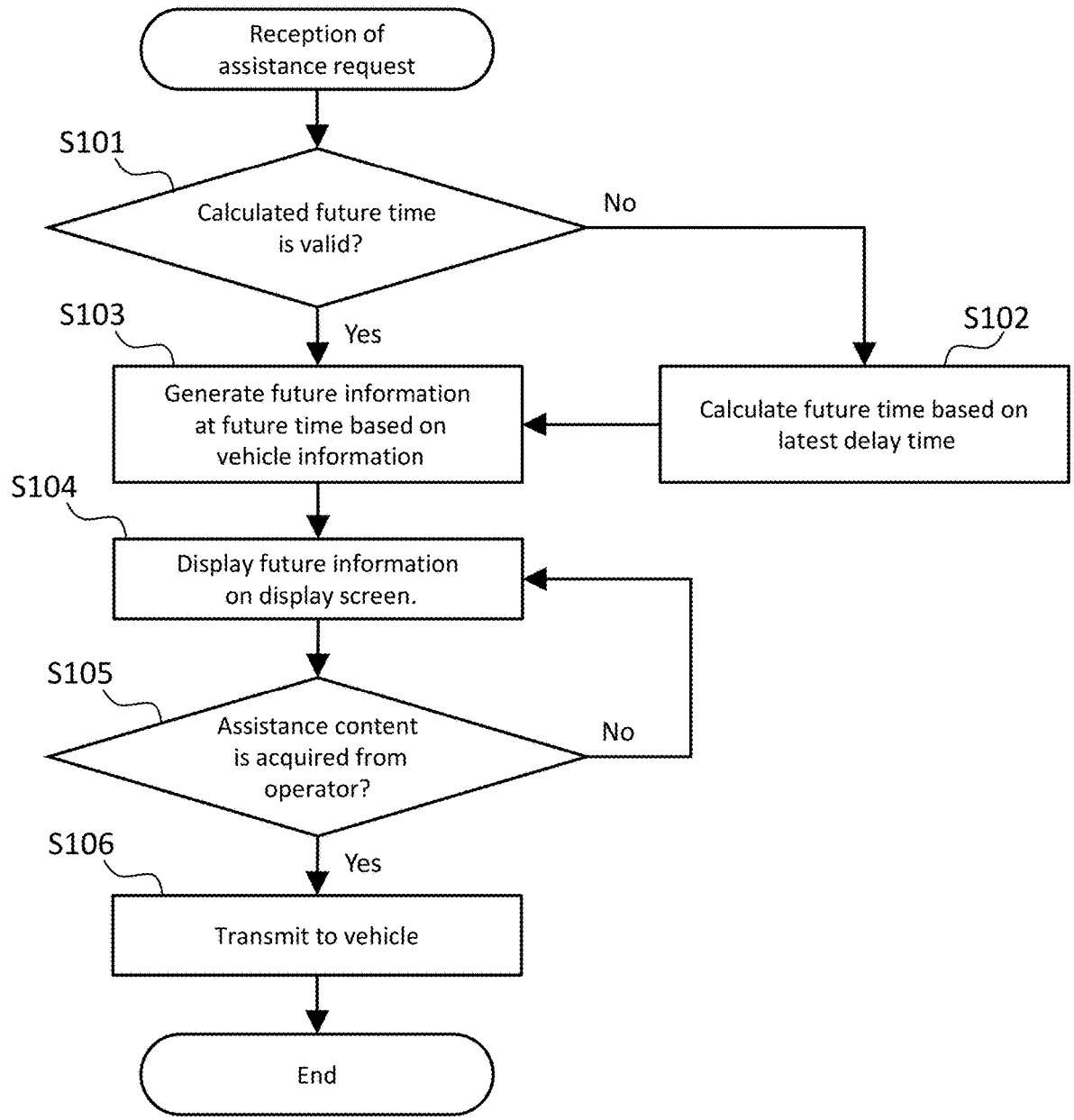
FIG. 13 is a flowchart illustrating an example of processing executed by the remote assistance terminal according to the embodiment of the present disclosure.

FIG. 13 is a flowchart illustrating an example of processing performed by the remote assistance terminal 30. The program 31c stored in the memory 31b of the remote assistance device 30 causes the processor 31a to execute a series of processes shown in this flowchart, and causes the remote assistance device 30 to function as the operator UI management system.

Step S101 is executed in response to reception of the assistance request from the vehicle 20. In step S101, it is determined whether or not the calculated future time is valid. If the calculated future time is valid, step S103 is executed. If the future time to be calculated is not valid, step S103 is executed after execution of step S102. In step S102, the future time is calculated based on the latest delay time.

The reason why steps S101 and S102 are executed is as follows. For example, it is assumed that a moving average of separately measured communication delays is used to calculate a future time. In this case, if the communication is interrupted more than expected, the interrupted time is included in the moving average value of the communication delays. Therefore, the future time calculated after the reconnection becomes an invalid time different from the future time calculated from the actual delay time. Alternatively, since the communication state is different between before and after the interruption, the delay time before the interruption may not be helpful. Therefore, when the communication is interrupted more than expected, the future time is calculated based on the latest delay time which is not affected by the interruption. Alternatively, the future time is calculated based on the delay time newly calculated after the interruption.

In step S103, future information at a future time is generated based on the vehicle information received from the vehicle 20. In step S104, the future information generated in step S103 is displayed on the display device 32.

In step S105, it is determined whether or not an assistance content has been acquired from the operator 40. Step S104 and step S105 are repeatedly executed until the assistance content is acquired from the operator 40. When the assistance content is acquired from the operator 40, step S106 is executed. In step S106, the acquired assistance content is transmitted to the vehicle 20.

Figure 14:
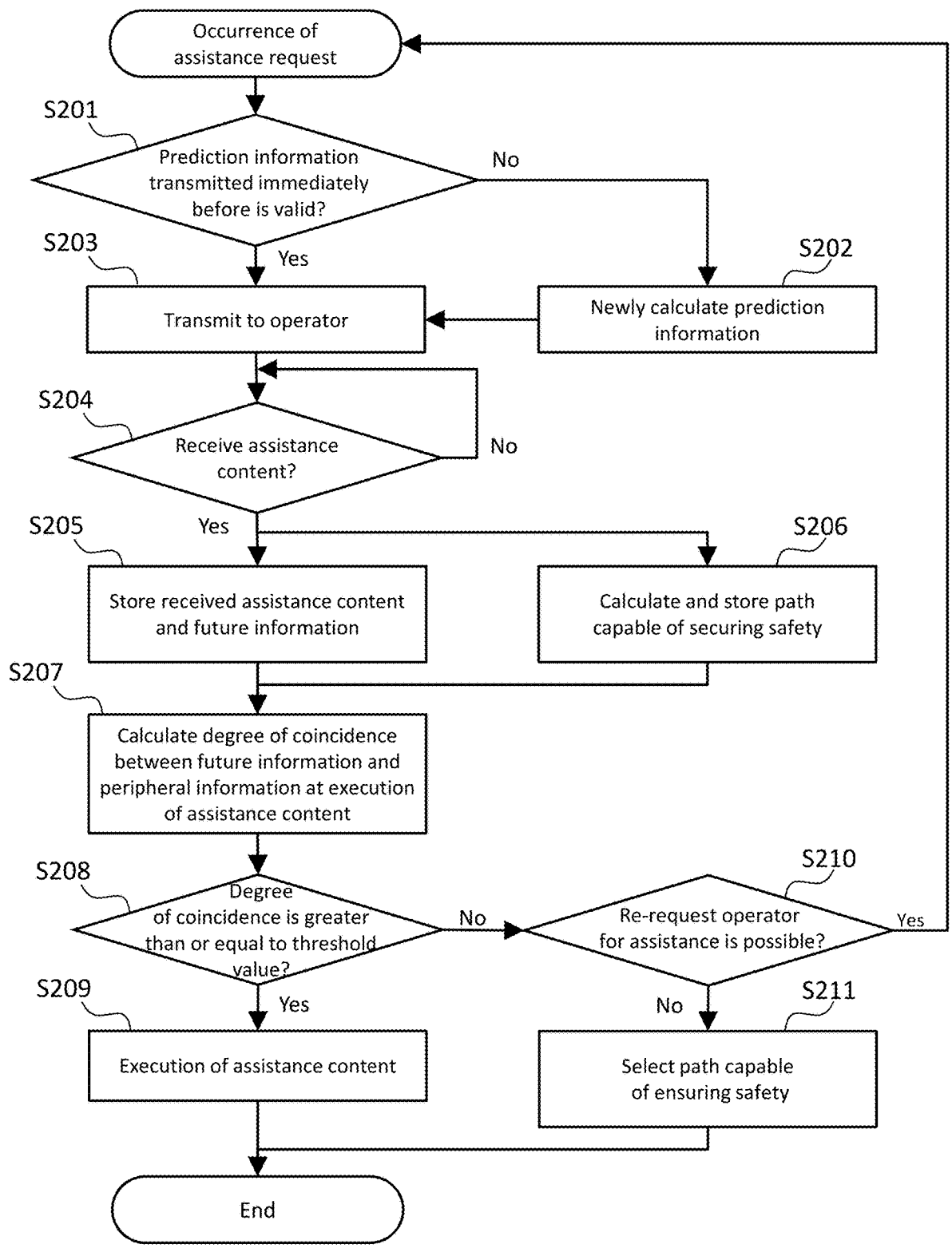
FIG. 14 is a flowchart illustrating an example of processing executed by the autonomous driving vehicle according to the embodiment of the present disclosure.

FIG. 14 is a flowchart illustrating an example of processing performed by the vehicle 20. The program 21c stored in the memory 21b of the vehicle 20 causes the processor 21a to execute a series of processes shown in the flowchart of FIG. 14.

In response to the occurrence of the assistance request, the vehicle 20 executes step S201. The assistance request is programmed to occur in response to the occurrence of a predefined event. In step S201, it is determined whether or not the prediction information transmitted immediately before to the remote assistance terminal 30 is valid.

An example of the case where the prediction information is invalid is a case where a predetermined time or more has elapsed since the prediction information transmitted last time. Another example of the prediction information being invalid is that the information on the predicted path of an object interfering with the path of the vehicle 20 has changed significantly from the previously transmitted information. The change in the information on the predicted path includes, for example, a state in which the interfering point approaches by a certain distance or more, a state in which the acceleration/velocity of the interfering object changes by a certain value or more, and a state in which the interfering object closest to the vehicle 20 changes to an object different from the previous object.

If the prediction information transmitted immediately before is valid, step S203 is executed. When the prediction information transmitted immediately before is not valid, step S203 is executed after execution of step S202. In step S202, new prediction information is calculated. In step S203, the valid prediction information is transmitted to the remote assistance device 30 as the vehicle information together with the path plan.

In step S204, it is determined whether or not the assistance content is received from the remote assistance device 30. Step S204 is repeatedly performed until the assistance content is received. When the assistance content is received, step S205 and step S206 are performed in parallel. In step S205, the received assistance content and the future information received together with the assistance content are temporarily stored. In step S206, a path that can ensure safety in the current situation of the vehicle 20 is calculated and temporarily stored.

Next, in step S207, the degree of coincidence between the future information temporarily stored in step S205 and peripheral information at the time of execution of the assistance content is calculated. The future information includes a future positional relationship between the vehicle 20 and the peripheral object displayed on the display device 32 when the assistance content is input by the operator 40. The peripheral information includes the actual positional relationship between the vehicle 20 and the peripheral object acquired by the external sensor 22. More specifically, the degree of coincidence calculated in step S207 is the degree of coincidence between the future positional relationship and the actual positional relationship.

In step S208, it is determined whether or not the degree of coincidence calculated in step S207 is within an allowable range, that is, whether or not the degree of coincidence is equal to or greater than a threshold value. If the degree of coincidence is equal to or greater than the threshold value, step S209 is executed. In step S209, the assistance content temporarily stored in step S205 is executed.

When the degree of coincidence is less than the threshold value, execution of the assistance content temporarily stored in step S205 is abandoned, and step S210 is executed instead. In step S210, it is determined whether the operator 40 can be re-requested for assistance. If it is possible to re-request the operator 40 for assistance, the processing returns to the initial process to generate an assistance request. If it is not possible to re-request the operator 40 for assistance, step S211 is executed. In step S211, the path that can ensure the safety temporarily stored in step S206 is executed.

Figure 15:
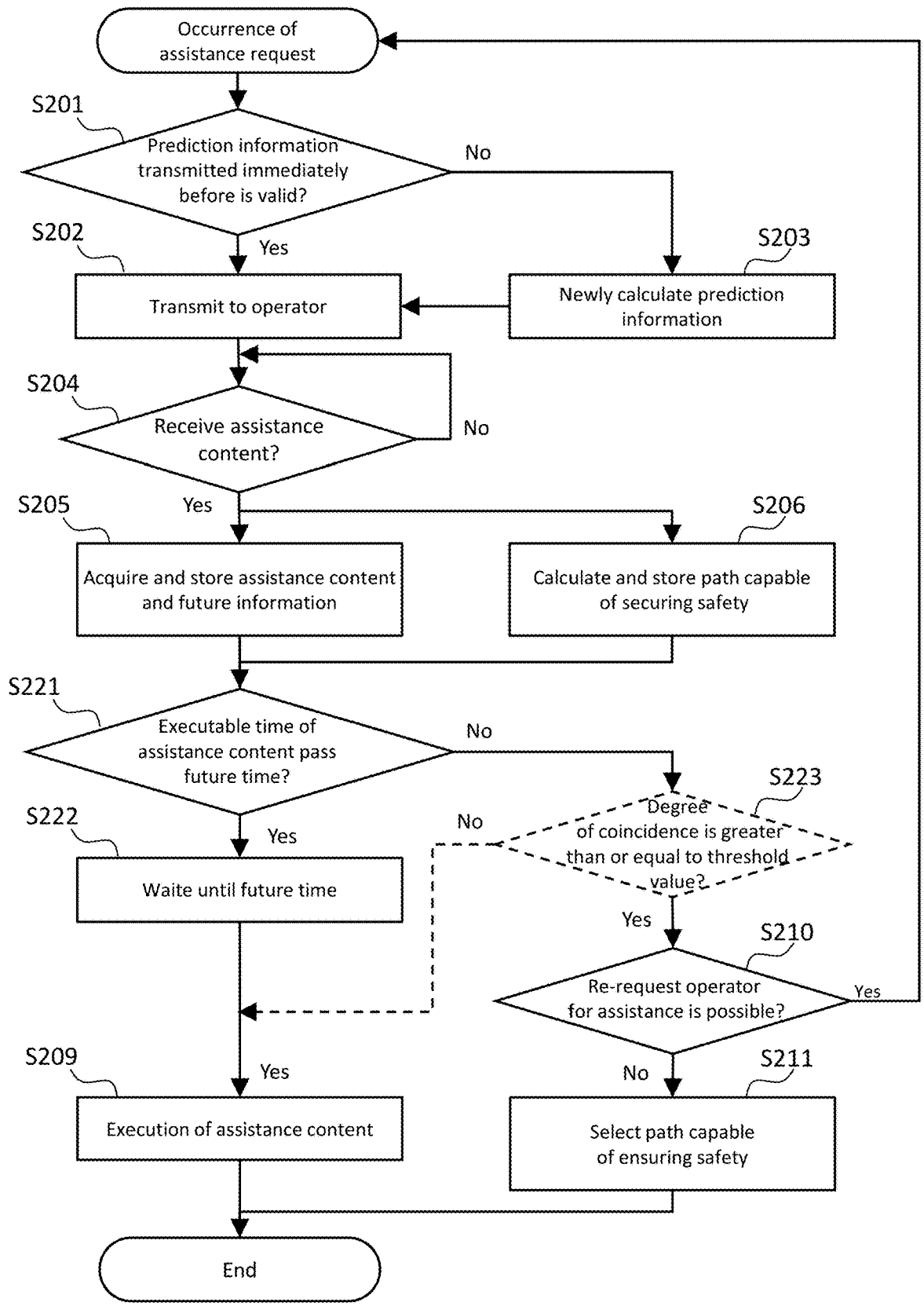
FIG. 15 is a flowchart illustrating another example of processing executed by the autonomous driving vehicle according to the embodiment of the present disclosure.

FIG. 15 is a flowchart illustrating another example of the processing executed by the vehicle 20. When this example is adopted, the program 21c stored in the memory 21b of the vehicle 20 causes the processor 21a to execute a series of processes shown in the flowchart of FIG. 15. Hereinafter, description of processing common to the flowchart of FIG. 14 will be omitted or simplified, and processing specific to the flowchart of FIG. 15 will be mainly described.

According to the flowchart of FIG. 15, step S205 and step S206 are followed by step S221. In step S221, the time at which the assistance content can be executed in the vehicle 20 is compared with the future time of the display device 32 when the assistance content is input. Then, it is determined whether or not the executable time of the assistance content is later than the future time.

When the executable time of the assistance content does not pass the future time, it can be determined that the positional relationship between the vehicle 20 and the peripheral object displayed on the display device 32 will be realized or will be realized in the future. Therefore, when the result of the determination in step S221 is affirmative, step S209 is executed after waiting until the future time in step S222. When the executable time of the assistance content coincides with the future time, the step S209 is immediately executed without waiting.

On the other hand, when the time at which the remote assistance can be executed in the vehicle 20 passes the future time, it can be determined that the positional relationship between the vehicle 20 and the peripheral object displayed on the display device 32 is no longer realized. Therefore, when the result of the determination in step S221 is negative, step S209 is not executed and step S210 is executed.

However, when the result of the determination in step S221 is negative, step S223 may be executed before execution of step S210. In step S223, the degree of coincidence between the future information temporarily stored in step S205 and the peripheral information at the time of execution of the assistance content is calculated.

As the result of the determination, if the degree of coincidence is equal to or greater than the threshold value, step S209 may be executed. That is, even when the future time has passed, the assistance content temporarily stored in step S205 may be executed as long as the positional relationship between the vehicle 20 and the peripheral object displayed on the display device 32 is actually realized. If the degree of coincidence is lower than the threshold value, step S209 is not executed and step S210 is executed.

When the above-described example is adopted as the processing by the vehicle 20, it is preferable that the delay time used for the calculation of the future time is set to be longer than the expected actual delay time. By doing so, after receiving the assistance content, the vehicle 20 can reliably execute the assistance content after waiting until the future time.

What is claimed is:

1. A remote assistance method for remotely assisting a vehicle having an autonomous traveling function, the method comprising:
spatially displaying, on a display device controlled by a processor, a positional relationship between the vehicle and an object present around the vehicle at a specified future time beyond a current time, the positional relationship being predicted based on a path plan for autonomous traveling created by the vehicle and information on the object;
receiving assistance content from a remote operator at an input device connected to the processor;
transmitting the assistance content input from a communication device connected to the processor to the vehicle;
confirming, after the vehicle has received the assistance content, that the positional relationship between the vehicle and the object displayed on the display device when the assistance content is input is realized after the vehicle receives the assistance content; and
executing, in the vehicle, remote assistance corresponding to the assistance content in response to confirmation that the positional relationship between the vehicle and the object displayed on the display device when the assistance content is input is realized after the vehicle receives the assistance content.

2. The remote assistance method according to claim 1, wherein the confirmation includes confirming that a degree of coincidence between the positional relationship between the vehicle and the object displayed on the display device when the assistance content is input and an actual positional relationship between the vehicle and the object acquired by a sensor of the vehicle is within an allowable range.

3. The remote assistance method according to claim 2, wherein the information on the object is information acquired by the sensor, and at least a part of the information on the object acquired by the sensor is used to create the path plan.

4. The remote assistance method according to claim 2, wherein the confirmation includes confirming that a time at which the remote assistance corresponding to the assistance content becomes executable in the vehicle is not past the specified future time of the positional relationship between the vehicle and the object displayed on the display device when the assistance content is input.

5. A remote assistance system for remotely assisting a vehicle having an autonomous traveling function, comprising:
at least one memory including at least one program;
at least one processor coupled with the at least one memory;
an input device connected to the at least one processor;
a communication device connected to the at least one processor; and
a display device controlled by the at least one processor,
wherein the at least one program is configured to cause the at least one processor to execute:
spatially displaying, on the display device, a positional relationship between the vehicle and an object present around the vehicle at a specified future time beyond a current time, the positional relationship being predicted based on a path plan for autonomous traveling created by the vehicle and information on the object;
receiving assistance content from a remote operator at the input device;
transmitting the assistance content input from the communication device to the vehicle;
confirming, after the vehicle has received the assistance content, that the positional relationship between the vehicle and the object displayed on the display device when the assistance content is input is realized after the vehicle receives the assistance content; and
executing, in the vehicle, remote assistance corresponding to the assistance content in response to confirmation that the positional relationship between the vehicle and the object displayed on the display device when the assistance content is input is realized after the vehicle receives the assistance content.

6. The remote assistance system according to claim 5, wherein the confirmation includes confirming that a degree of coincidence between the positional relationship between the vehicle and the object displayed on the display device when the assistance content is input and an actual positional relationship between the vehicle and the object acquired by a sensor of the vehicle is within an allowable range.

7. The remote assistance system according to claim 6, wherein the information on the object is information acquired by the sensor, and at least a part of the information on the object acquired by the sensor is used to create the path plan.

8. The remote assistance system according to claim 6, wherein the confirmation includes confirming that a time at which the remote assistance corresponding to the assistance content becomes executable in the vehicle is not past the specified future time of the positional relationship between the vehicle and the object displayed on the display device when the assistance content is input.

9. A non-transitory computer-readable storage medium storing at least one program for causing a computer to execute processing, the processing comprising:
spatially displaying, on a display device controlled by a processor, a positional relationship between a vehicle having an autonomous traveling function and an object present around the vehicle at a specified future time beyond a current time, the positional relationship being predicted based on a path plan for autonomous traveling created by the vehicle and information on the object;
receiving assistance content from a remote operator at an input device connected to the processor;
transmitting the assistance content input from a communication device connected to the processor to the vehicle;
confirming, after the vehicle has received the assistance content, that the positional relationship between the vehicle and the object displayed on the display device when the assistance content is input is realized after the vehicle receives the assistance content; and
executing, in the vehicle, remote assistance corresponding to the assistance content in response to confirmation that the positional relationship between the vehicle and the object displayed on the display device when the assistance content is input is realized after the vehicle receives the assistance content.

* * * * *